United States Patent
Bansal

(10) Patent No.: US 11,727,692 B2
(45) Date of Patent: *Aug. 15, 2023

(54) DETECTION OF EMERGENCY VEHICLES

(71) Applicant: Waymo LLC, Mountain View, CA (US)

(72) Inventor: Mayank Bansal, Sunnyvale, CA (US)

(73) Assignee: Waymo LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/555,760

(22) Filed: Dec. 20, 2021

(65) Prior Publication Data

US 2022/0130133 A1 Apr. 28, 2022

Related U.S. Application Data

(63) Continuation of application No. 16/682,747, filed on Nov. 13, 2019, now Pat. No. 11,216,689.

(Continued)

(51) Int. Cl.
*G06V 20/58* (2022.01)
*G06V 10/25* (2022.01)
(Continued)

(52) U.S. Cl.
CPC .......... *G06V 20/58* (2022.01); *G05D 1/0212* (2013.01); *G06V 10/25* (2022.01); *G06V 20/584* (2022.01); *G05D 2201/0213* (2013.01)

(58) Field of Classification Search
None
See application file for complete search history.

(56) References Cited

U.S. PATENT DOCUMENTS

| 9,278,689 B1 | 3/2016 | Delp |
| 9,576,208 B2 | 2/2017 | Agnew et al. |

(Continued)

FOREIGN PATENT DOCUMENTS

| CN | 104842874 A | | 8/2015 |
| CN | 106652465 A | * | 5/2017 |

(Continued)

OTHER PUBLICATIONS

International Search Report and Written Opinion for Application No. PCT/US20/42773 dated Oct. 30, 2020.

(Continued)

*Primary Examiner* — Mohammed Rachedine
(74) *Attorney, Agent, or Firm* — Botos Churchill IP Law

(57) ABSTRACT

Aspects of the disclosure relate to detecting an emergency vehicle. For instance, a plurality of images may be taken from a perspective of an autonomous vehicle. One or more gates representing a region of interest at a respective distance from the vehicle may be generated for the images. A plurality of lights may be detected within the one or more gates. A first candidate emergency vehicle may be identified from a detected plurality of lights in one or more gates of one of the images, and a second candidate emergency vehicle may be identified from a detected plurality of lights in one or more gates of another of the images. The first and second candidate emergency vehicles are determined to be the same emergency vehicle and to be active. An operational system of the autonomous vehicle is controlled based on the determination that the given emergency vehicle is active.

20 Claims, 15 Drawing Sheets

Related U.S. Application Data

(60) Provisional application No. 62/879,636, filed on Jul. 29, 2019.

(51) Int. Cl.
| | | |
|---|---|---|
| *G06V 10/20* | (2022.01) | |
| *G06V 10/75* | (2022.01) | |
| *B60W 40/02* | (2006.01) | |
| *B60W 30/10* | (2006.01) | |
| *B60W 40/10* | (2012.01) | |
| *B60W 60/00* | (2020.01) | |
| *G05D 1/02* | (2020.01) | |

(56) References Cited

U.S. PATENT DOCUMENTS

| | | | |
|---|---|---|---|
| 11,351,988 B2 * | 6/2022 | Soltanian | G05D 1/0289 |
| 2015/0161458 A1 * | 6/2015 | Agnew | G06V 20/584 |
| | | | 382/104 |
| 2016/0252905 A1 * | 9/2016 | Tian | G06V 20/584 |
| | | | 701/23 |
| 2017/0308760 A1 | 10/2017 | Kwon et al. | |
| 2018/0137756 A1 | 5/2018 | Moosaei et al. | |
| 2018/0364732 A1 | 12/2018 | Yaldo et al. | |
| 2019/0039613 A1 | 2/2019 | Lee et al. | |
| 2019/0311546 A1 * | 10/2019 | Tay | G05D 1/0088 |
| 2020/0031337 A1 * | 1/2020 | Soltanian | G06V 20/58 |
| 2020/0110949 A1 * | 4/2020 | Asvatha Narayanan | |
| | | | G08G 1/015 |
| 2020/0372794 A1 * | 11/2020 | Park | G08G 1/054 |

FOREIGN PATENT DOCUMENTS

| | | | | |
|---|---|---|---|---|
| CN | 106652465 | A | 5/2017 | |
| CN | 108068819 | A | 5/2018 | |
| CN | 109131328 | A | 1/2019 | |
| CN | 109960978 | A | 7/2019 | |
| DE | 102017126790 | A1 * | 5/2018 | G05D 1/0287 |
| EP | 3633541 | A1 * | 4/2020 | G06K 9/00503 |
| GB | 2577734 | A * | 4/2020 | G06K 9/00503 |
| JP | H0611570 | A | 1/1994 | |
| JP | 2010067164 | A | 3/2010 | |
| KR | 20190014871 | A | 2/2019 | |
| KR | 20200064873 | A | 6/2020 | |

OTHER PUBLICATIONS

Mariella Moon, Waymo teachers its autonomous cars to detect emergency vehicles., https://www.engadget.com/2017/07/11/waymo-teaches-autonomous-cars-to-detect-emergency-vehicles/?guccounter-1, retrieved from internet on May 21, 2019, pp. 1-10.

The First Office Action for Chinese Patent Application No. 202080063829.X, dated Aug. 22, 2022.

The Extended European Search Report for European Patent Application No. 20848428.7, dated Mar. 22, 2023.

Roy, et al., "Emergency Vehicle Detection on Heavy Traffic Road from CCTV Footage Using Deep Convolutional Neural Network", International Conference on Electrical, Computer and Communication Engineering, 2019, 6 Pages.

Notice of Reasons for Rejection for Japanese Patent Application No. 2022-504106, dated Mar. 1, 2023.

Notice of Preliminary Rejection for Korean Patent Application No. 10-2022-7006149, dated May 22, 2023, 11 Pages.

\* cited by examiner

DETECTION OF EMERGENCY VEHICLES

CROSS REFERENCE TO RELATED APPLICATIONS

The present application is a continuation of U.S. patent application Ser. No. 16/682,747, filed Nov. 13, 2019, issuing on Jan. 4, 2022 as U.S. Pat. No. 11,216,689, which claims the benefit of the filing date of U.S. Provisional Application No. 62/879,636, filed Jul. 29, 2019, the entire disclosures of which are incorporated herein by reference.

BACKGROUND

Autonomous vehicles, such as vehicles that do not require a human driver, can be used to aid in the transport of passengers or items from one location to another. Such vehicles may operate in a fully autonomous driving mode where passengers may provide some initial input, such as a destination, and the vehicle maneuvers itself to that destination. Thus, such vehicles may be largely dependent on systems that are capable of determining the location of the autonomous vehicle at any given time, as well as detecting and identifying objects external to the vehicle, such as other vehicles, stop lights, pedestrians, etc.

BRIEF SUMMARY

Aspects of the disclosure provide system for detecting an emergency vehicle. The system includes an operational system of a vehicle and one or more computing devices in communication with the operational system. The one or more computing devices are configured to receive a plurality of images of an environment from a perspective of the vehicle, the plurality of images including a first image and an additional image; generate one or more gates in the plurality of images, each of the one or more gates representing a region of interest at a respective distance from the vehicle; detect a plurality of lights within the one or more gates; identify a first candidate emergency vehicle corresponding with a group of the detected plurality of lights in a given gate of the one or more gates of the first image; identify a second candidate emergency vehicle corresponding with a group of the detected plurality of lights in ones of the one or more gates of the additional image; determine the first candidate emergency vehicle and the second candidate emergency vehicle are a same given emergency vehicle; determine that the given emergency vehicle is active; and operate the operational system of the vehicle based on the determination that the given emergency vehicle is active.

In one example, the one or more computing devices are further configured to select one or more regions within which to generate the one or more gates. In another example, the one or more computing devices are further configured to mask pixels in the first image associated with areas in the environment that are not relevant to emergency vehicles. In another example, the one or more computing devices are configured to identify the first candidate emergency vehicle based on a first candidate vehicle polygon generated to encompass the group of the detected plurality of lights within the given gate in the first image. In this example, the one or more computing devices are configured to determine the first candidate emergency vehicle and the second candidate emergency vehicle are the same given emergency vehicle based on a second candidate vehicle polygon generated to encompass the group of the detected plurality of lights and the given gate in the additional image and a measure of similarity between the first candidate vehicle polygon and the second candidate vehicle polygon. In addition or alternatively, the one or more computing devices are further configured to identify characteristics of the active emergency vehicle based on the first candidate vehicle polygon. In another example, the one or more computing devices are configured to determine that the given emergency vehicle is active based on a validation of the first candidate emergency vehicle or the second candidate emergency vehicle. In this example, the validation includes checking characteristics of the active candidate emergency vehicle against other detected objects. In addition or alternatively, the validation includes filtering false positives of detected objects within the one or more gates. In another example, the one or more computing devices are further configured to identify characteristics of the active emergency vehicle based on the one or more gates of the first image or the one or more gates of the additional image. In another example, the operational system of the vehicle is a navigation system for planning trajectories for the vehicle. In another example, the operational system of the vehicle is a deceleration system for slowing the vehicle to a stop. In another example, the operational system of the vehicle is a steering system for controlling the angle of wheels to turn the vehicle. In another example, the one or more computing devices are configured to detect the plurality of lights by identifying lights within a particular frequency range. In another example, the one or more computing devices are configured to detect the plurality of lights includes filtering lights outside of a particular frequency range.

Another aspect of the disclosure provides a method for detecting an emergency vehicle. The method includes receiving, by one or more computing devices, a plurality of images taken from a perspective of an autonomous vehicle, the plurality of images including a first image and an additional image; generating, by the one or more computing devices, one or more gates in the plurality of images, each of the one or more gates representing a region of interest at a respective distance from the vehicle; detecting, by the one or more computing devices, a plurality of lights within the one or more gates; identifying, by the one or more computing devices, a first candidate emergency vehicle corresponding with a group of the detected plurality of lights in ones of the one or more gates of the first image; identifying, by the one or more computing devices, a second candidate emergency vehicle corresponding with a group of the detected plurality of lights in a given gate of the one or more gates of the additional image; determining, by the one or more computing devices, the first candidate emergency vehicle and the second candidate emergency vehicle are a same given emergency vehicle; determining, by the one or more computing devices, that the given emergency vehicle is active; and operating, by the one or more computing devices, an operational system of the vehicle based on the determination that the given emergency vehicle is active.

In one example, the method also includes selecting, by the one or more computing devices, one or more regions within which to generate the one or more gates. In another example, the method also includes masking, by the one or more computing devices, pixels in the first image associated with objects that are not relevant to emergency vehicles. In another example, identifying the first candidate emergency vehicle includes generating a first candidate vehicle polygon to encompass the group of the detected plurality of lights and the given gate in the first image. In this example, determining the first candidate emergency vehicle and the second candidate emergency vehicle are the same given emergency vehicle includes generating a second candidate vehicle polygon to encompass the group of the detected plurality of lights and the given gate in the additional image; projecting the second candidate vehicle polygon into the first image; determining a measure of similarity between the first candidate vehicle polygon and the projected second candidate vehicle polygon; and determining that the first candidate emergency vehicle and the second candidate emergency vehicle are the same given emergency vehicle when the amount of similarity is greater than a threshold amount. In another example, determining that the given emergency vehicle is active includes validating the first candidate emergency vehicle or the second candidate emergency vehicle. In another example, identifying characteristics of the active emergency vehicle based on the one or more gates of the first image or the one or more gates of the additional image.

DETAILED DESCRIPTION

Overview

Figure 1:
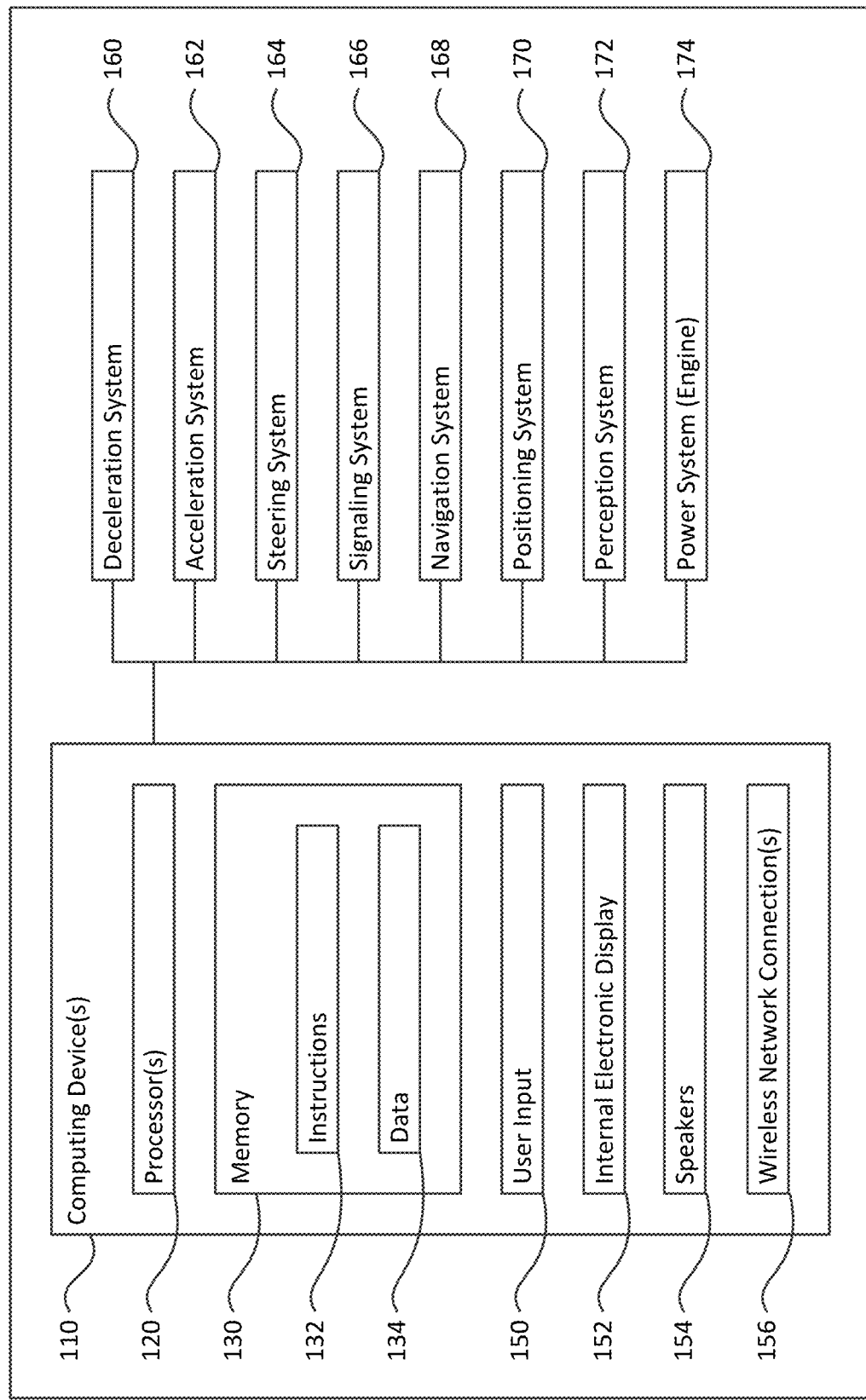
FIG. 1 is a functional diagram of an example vehicle in accordance with aspects of the disclosure.

The technology relates to long-range detection of emergency vehicles for an autonomous vehicle. Being able to detect an emergency vehicle earlier while the emergency vehicle is at a greater distance would allow the autonomous vehicle to adjust its path or behavior earlier or in a more accurate, efficient manner. Emergency vehicles include, for example, police cars, ambulances, and fire trucks, among others. The approach may include selecting one or more regions in a first image based on geometry of a roadway in order to limit the image search space to where oncoming vehicles are or are likely to be. Candidate boxes may be determined within the selected regions according to where flashing red and blue lights are detected in the regions, since flashing red and blue lights are often associated with active emergency vehicles.

An autonomous vehicle may include an image capture system configured to capture one or more images in a forward-facing direction relative to the autonomous vehicle, including a first image. The vehicle's computing devices may be configured to select one or more regions in the first image according to roadgraph geometry. The selected one or more regions may be areas where oncoming traffic is or is likely to be. Roadgraph geometry may be determined by detecting lane features in the first image. The lane features may be used to identify lanes for a same direction as a lane of travel of the autonomous vehicle and lanes for an opposite direction as the autonomous vehicle's lane of travel.

The vehicle's computing devices may then generate one or more gates in the selected one or more regions. Each gate may represent a region of interest at particular distances from the autonomous vehicle. The one or more gates may be generated starting from where a range of short-range sensors of the autonomous vehicle ends. The one or more gates may end at a distance where the lanes for the opposite direction become imperceptible or where a nominal emergency vehicle would become smaller than a first threshold amount of pixels in the first image. After the one or more gates are generated, the vehicle's computing devices may determine whether any red or blue lights are within the one or more gates.

The vehicle's computing devices may then identify a candidate emergency vehicle corresponding with a group of red or blue lights in a given gate of the one or more gates. The group of red or blue lights may be a plurality of red or blue lights within the given gates that are in close proximity with one another. Identifying the candidate emergency vehicle may include generating a first candidate vehicle polygon according to the group of red or blue lights and the given gate. Identifying the candidate emergency vehicle may also include determining whether red or blue lights are in one or more additional images taken before and/or after the first image. Using the one or more additional images may be included in order to capture a flashing light. An additional candidate vehicle polygon may be generated according to the red or blue lights for each of the one or more additional images.

The first candidate vehicle polygon in the first image may be associated with at least one additional candidate vehicle polygon in at least one of the one or more additional images. The association between candidate vehicle polygones allows the autonomous vehicle to determine that the associated candidate vehicle polygones correspond to the same candidate emergency vehicle and also allows the autonomous vehicle to track the behavior of the candidate emergency vehicle over time. In addition, the association may capture flashing lights on the candidate emergency vehicle over time. The association may be generated by projecting the at least one additional candidate vehicle polygon into the first image.

Projecting the at least one additional candidate vehicle polygon into the first image may include aligning the at least one additional candidate vehicle polygon in the first image based on (i) the size and position of the at least one additional candidate vehicle polygon and (ii) a relative motion of the autonomous vehicle between the first image and the corresponding at least one additional image. A given additional image of the at least one additional image may be associated with the first image when a measure of similarity exceeds a second threshold amount. The measure of similarity may be determined based on an amount of physical intersection between the first candidate vehicle polygon and a given additional candidate vehicle polygon of the at least one additional candidate vehicle polygon that is projected into the first image.

After associating the first candidate vehicle polygon with the at least one additional candidate vehicle polygon, the vehicle's computing devices may determine the candidate emergency vehicle is an active emergency vehicle. This determination may include comparing the red or blue lights in the first candidate vehicle polygon with the red or blue lights in the at least one additional candidate vehicle polygon. A difference in a number of lights, an intensity of lights, or a position of lights may be an indication that the candidate emergency vehicle has flashing lights.

In some implementations, determining the candidate emergency vehicle is an active emergency vehicle includes validating the active emergency vehicle by removing possible false positives or checking characteristics of the active candidate emergency vehicle against other detected objects. For removing false positives, the vehicle's computing devices may filter out objects detected in a given image based on features that are uncharacteristic of an active emergency vehicle or unreliable indicators of an active emergency vehicle. Another example of removing false positives includes comparing the candidate emergency vehicle in the given image with objects detected by the perception system of the autonomous vehicle.

After determining the candidate emergency vehicle is an active emergency vehicle, the vehicle's computing devices may operate the autonomous vehicle according to characteristics of the active emergency vehicle. Characteristics may include a location, a motion, a speed, or a predicted route of the active emergency vehicle. Operating the autonomous vehicle may include determining a route for the autonomous vehicle to yield to the active emergency vehicle, controlling a system of the autonomous vehicle to slow to a future stop, or other actions to properly respond to the active emergency vehicle.

The features described above may provide for an autonomous vehicle that is able to identify emergency vehicles, which may vary largely in appearance, at an earlier point in time, at a farther distance, and using less data than other machine learning techniques. As such, the autonomous vehicle may then begin to prepare to respond to the emergency vehicle at an earlier point in time. In addition, the features described also provide for a method of identifying false positives that allows the autonomous vehicle to respond accurately to objects in its environment.

Example Systems

As shown in FIG. 1, a vehicle 100 in accordance with one aspect of the disclosure includes various components. While certain aspects of the disclosure are particularly useful in connection with specific types of vehicles, the vehicle 100 may be any type of vehicle including, but not limited to, cars, trucks, motorcycles, busses, recreational vehicles, etc. The vehicle 100 may have one or more computing devices, such as computing devices 110 including one or more processors 120, memory 130 and other components typically present in general purpose computing devices.

The one or more processor 120 may be any conventional processors, such as commercially available CPUs. Alternatively, the one or more processors may be a dedicated device such as an ASIC or other hardware-based processor.

The memory 130 stores information accessible by the one or more processors 120, including instructions 132 and data 134 that may be executed or otherwise used by the processor 120. The memory 130 may be of any type capable of storing information accessible by the processor, including a computing device-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 132 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

The data 134 may be retrieved, stored or modified by processor 120 in accordance with the instructions 132. For instance, although the claimed subject matter is not limited by any particular data structure, the data may be stored in computing device registers, in a relational database as a table having a plurality of different fields and records, XML documents or flat files. The data may also be formatted in any computing device-readable format.

Although FIG. 1 functionally illustrates the processor, memory, and other elements of computing devices 110 as being within the same block, it will be understood by those of ordinary skill in the art that the processor, computing device, or memory may actually include multiple processors, computing devices, or memories that may or may not be stored within the same physical housing. For example, memory may be a hard drive or other storage media located in a housing different from that of computing devices 110. Accordingly, references to a processor or computing device will be understood to include references to a collection of processors or computing devices or memories that may or may not operate in parallel.

Computing devices 110 may include all of the components normally used in connection with a computing device such as the processor and memory described above as well as a user input 150 (e.g., a mouse, keyboard, touch screen and/or microphone) and various electronic displays (e.g., a monitor having a screen or any other electrical device that is operable to display information). In this example, the vehicle includes an internal electronic display 152 as well as one or more speakers 154 to provide information or audio visual experiences. In this regard, internal electronic display 152 may be located within a cabin of vehicle 100 and may be used by computing devices 110 to provide information to passengers within the vehicle 100.

Computing devices 110 may also include one or more wireless network connections 156 to facilitate communication with other computing devices, such as the client computing devices and server computing devices described in detail below. The wireless network connections may include short range communication protocols such as Bluetooth, Bluetooth low energy (LE), cellular connections, as well as various configurations and protocols including the Internet, World Wide Web, intranets, virtual private networks, wide area networks, local networks, private networks using communication protocols proprietary to one or more companies, Ethernet, Wi-Fi and HTTP, and various combinations of the foregoing.

In one example, computing devices 110 may be an autonomous driving computing system incorporated into vehicle 100. The autonomous driving computing system may capable of communicating with various components of the vehicle in order to maneuver vehicle 100 in a fully autonomous driving mode and/or semi-autonomous driving mode. For example, returning to FIG. 1, computing devices 110 may be in communication with various operational systems of vehicle 100, such as deceleration system 160, acceleration system 162, steering system 164, signaling system 166, navigation system 168, positioning system 170, perception system 172, and power system 174 (for instance, a gasoline or diesel powered motor or electric engine) in order to control the movement, speed, etc. of vehicle 100 in accordance with the instructions 132 of memory 130. Again, although these systems are shown as external to computing devices 110, in actuality, these systems may also be incorporated into computing devices 110, again as an autonomous driving computing system for controlling vehicle 100.

As an example, computing devices 110 may interact with deceleration system 160 and acceleration system 162 in order to control the speed of the vehicle. Similarly, steering system 164 may be used by computing devices 110 in order to control the direction of vehicle 100. For example, if vehicle 100 is configured for use on a road, such as a car or truck, the steering system may include components to control the angle of wheels to turn the vehicle. Signaling system 166 may be used by computing devices 110 in order to signal the vehicle's intent to other drivers or vehicles, for example, by lighting turn signals or brake lights when needed.

Navigation system 168 may be used by computing devices 110 in order to determine and follow a route to a location. For instance, the navigation system may function to generate routes between locations and plan trajectories for the vehicle in order to follow this route. Although depicted as a single system, the navigation system may actually comprise multiple systems to achieve the aforementioned routing and planning functions. In this regard, the navigation system 168 and/or data 134 may store detailed map information, e.g., highly detailed maps identifying the shape and elevation of roadways, lane lines, intersections, crosswalks, speed limits, traffic signals, buildings, signs, real time traffic information, vegetation, or other such objects and information. In other words, this detailed map information may define the geometry of vehicle's expected environment including roadways as well as speed restrictions (legal speed limits) for those roadways. Specifically, the map information may include a roadgraph defining the geometry of roadway features such as lanes, medians, curbs, crosswalks, etc. As an example, the roadgraph may include a plurality of points and/or line segments with connections to one another defining the geometry (e.g. size, shape, dimensions, and locations) of the aforementioned roadway features. The coordinates of such features may be defined in a Euclidean coordinate system such that the geometry includes x, y and z dimensions, that is lateral, longitudinal, and elevation information for each roadway feature relative to some point on the earth. Of course, these dimensions may be defined in GPS coordinates or other coordinate systems. The roadgraph may also include information which identifies how a vehicle is expected to travel in a given roadway, including direction (i.e. lawful direction of traffic in each lane), lane position, speed, etc. For instance, this map information may include information regarding traffic controls, such as traffic signal lights, stop signs, yield signs, etc. This information, in conjunction with real time information received from the perception system 172, can be used by the computing devices 110 to determine which directions of traffic are oncoming traffic lanes and/or have the right of way at a given location.

The perception system 172 also includes one or more components for detecting objects external to the vehicle such as other vehicles, obstacles in the roadway, traffic signals, signs, trees, etc. For example, the perception system 172 may include one or more imaging sensors including visible-light cameras, thermal imaging systems, laser and radio-frequency detection systems (e.g., LIDAR, RADAR, etc.), sonar devices, microphones, and/or any other detection devices that record data which may be processed by computing devices 110. A visible-light camera or another type of image capture system may be configured to capture one or more images in a forward-facing direction relative to the vehicle. A laser detection sensor or other type of sensor may provide direct range measure, which may have a range constraint. There may be a short-range sensor and a long-range sensor in the one or more imaging sensors that have different range constraints. For example, the range constraint for a short-range sensor may be 60 meters or more or less. The range constraint for a long-range sensor may be greater than that of the short-range sensor, such as 150 meters. At points beyond the range constraints of one or more of the short-range sensors, the perception system 172 may have a reduced ability to collect data.

The one or more imaging sensors of the perception system 172 may detect objects and their characteristics such as location, orientation, size, shape, type, direction and speed of movement, etc. The raw data from the sensors and/or the aforementioned characteristics can be quantified or arranged into a descriptive function or vector and sent for further processing to the computing devices 110. As an example, computing devices 110 may use the positioning system 170 to determine the vehicle's location and perception system 172 to detect and respond to objects when needed to reach the location safely.

Figure 2:
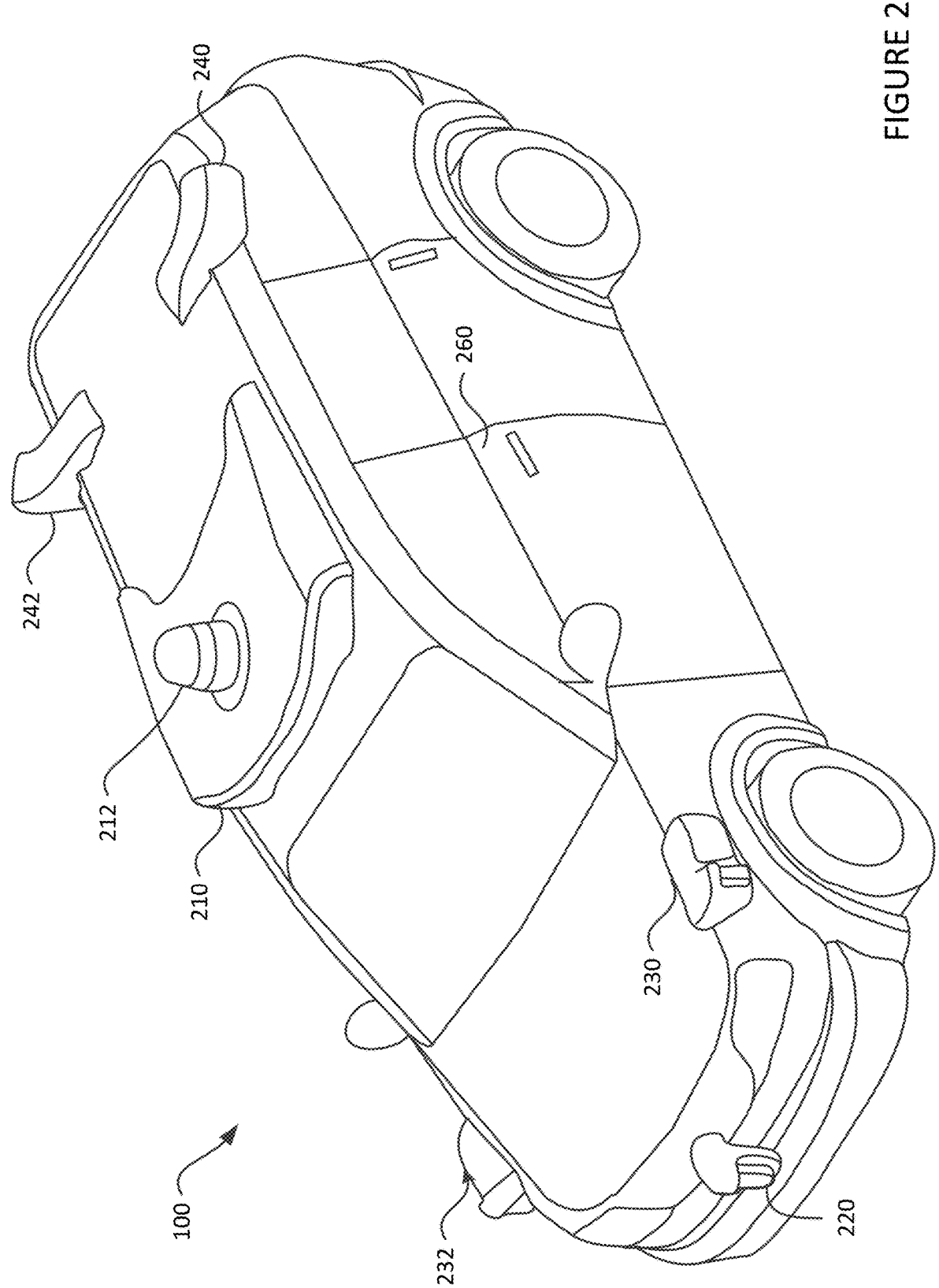
FIG. 2 is an example representative view of a vehicle in accordance with aspects of the disclosure.

FIG. 2 is an example external view of vehicle 100 including aspects of the perception system 172. For instance, roof-top housing 210 and dome housing 212 may include a LIDAR sensor or system as well as various cameras and radar units. In addition, housing 220 located at the front end of vehicle 100 and housings 230, 232 on the driver's and passenger's sides of the vehicle may each store a LIDAR sensor or system. For example, housing 230 is located in front of driver door 260. Vehicle 100 also includes housings 240, 242 for radar units and/or cameras also located on the roof of vehicle 100. Additional radar units and cameras (not shown) may be located at the front and rear ends of vehicle 100 and/or on other positions along the roof or roof-top housing 210.

Example Methods

In addition to the operations described above and illustrated in the figures, various operations will now be described. It should be understood that the following operations do not have to be performed in the precise order described below. Rather, various steps can be handled in a different order or simultaneously, and steps may also be added or omitted.

Figure 3A:
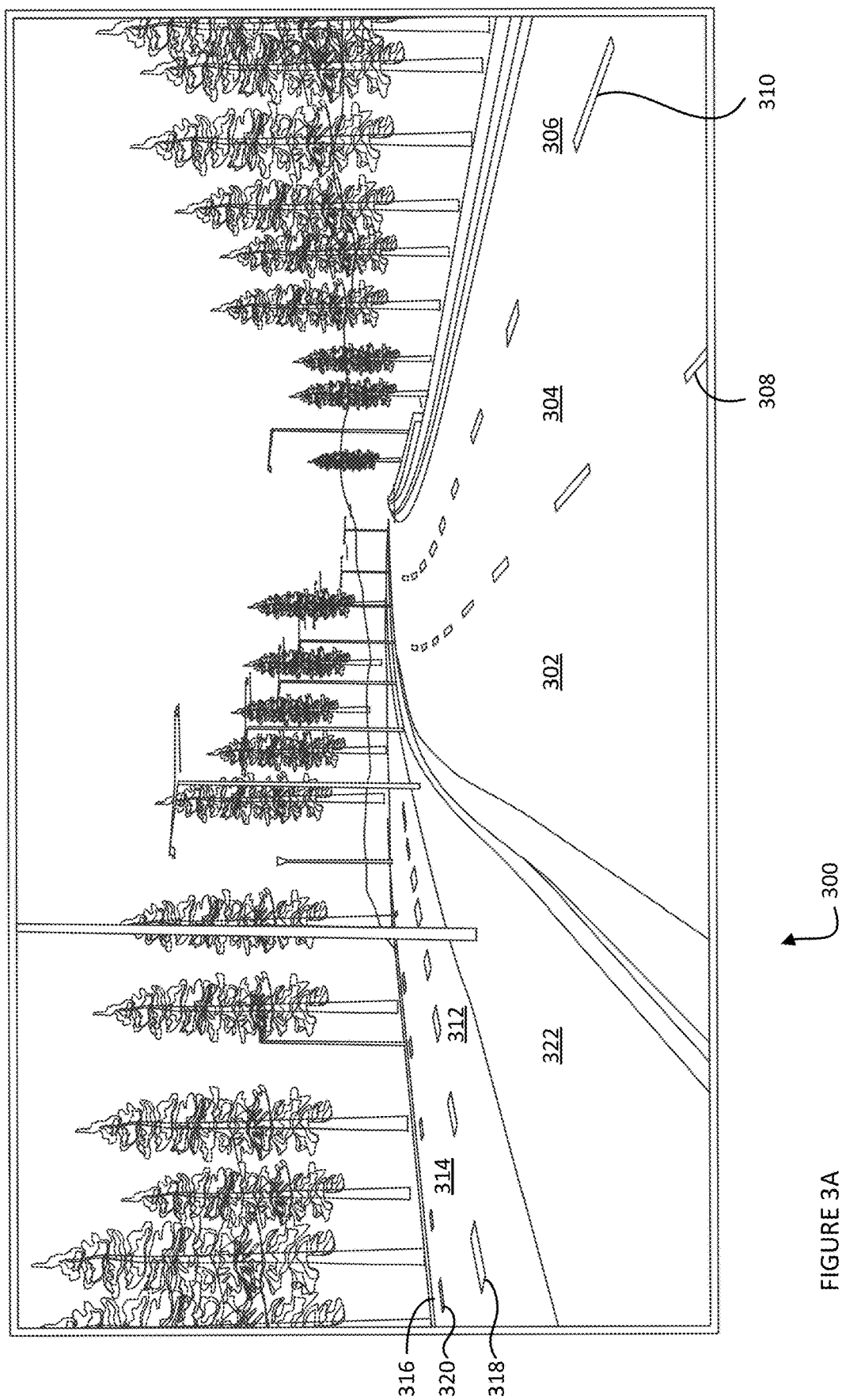
FIGS. 3A, 3B, and 3C show an example image 300 in accordance with aspects of the disclosure.

Using an image capture system in the perception system 172, the vehicle's computing devices 110 may capture an image in a forward-facing direction relative to a heading of the vehicle 100. The heading of the vehicle 100, or the pose of the vehicle 100, may be stored in association with the captured image. An example first image 300 is shown in FIG. 3A. Captured in the first image 300 are a plurality of roadway features, including lanes 302, 304, 306, 312, 314, 316, lane lines 308, 310, 318, 320, and a median 322. first lane 302 in which the vehicle 100 is travelling. A second lane 304 and a third lane 306 are depicted in the first image 300 for a same direction of travel as the first lane 302. Dashed lane lines 308 and 310 are shown defining each of lanes 302, 304, and 306 from one another. A fourth lane 312, fifth lane 314, and sixth lane 316 are shown for an opposite direction of travel as the first lane 302. Dashed lane lines 318 and 320 are shown defining each of lanes 312, 314, and 316 from one another. Lanes 312, 314, and 316 are shown in the first image 300 as separated from lanes 302, 304, and 306 by a median strip 322. Other roadway features may also be captured in the first image other than those discussed above, such as solid lane lines, double lane lines, road signs, traffic lights, etc.

Figure 4A:
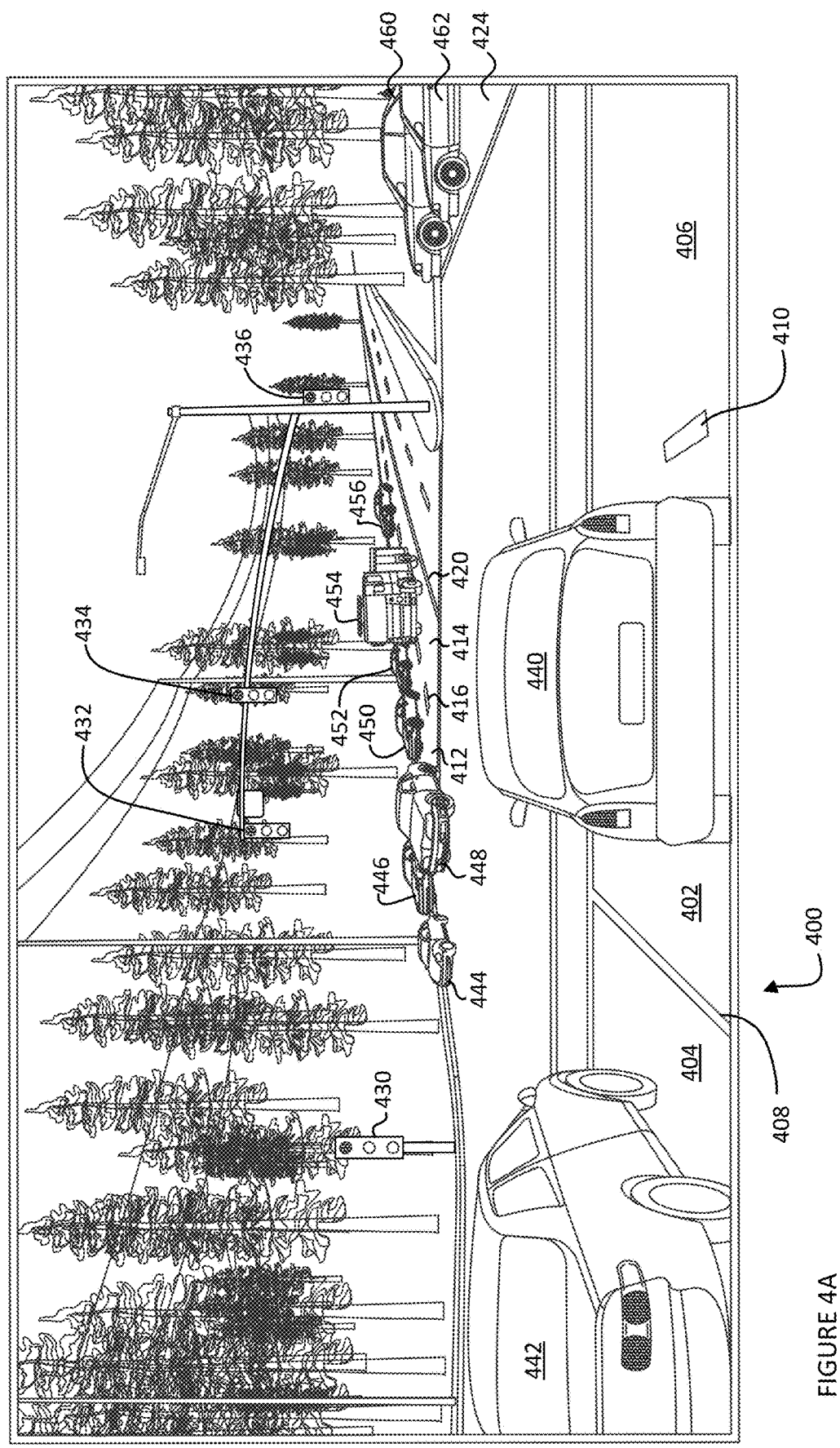
FIGS. 4A, 4B, and 4C show an example image 400 in accordance with aspects of the disclosure.

An example second image 400 captured by the image capture system in the perception system 172 is shown in FIG. 4A. A plurality of roadway features captured in the second image 400 includes roadway features such as lanes 402, 404, 406, 412, 414, lane lines 408, 410, 416, double lane lines 420, cross street 424, and traffic lights 430, 432, 434, 436, among others. The stop lights of traffic lights 430, 432, 434, and 436 are lit with red light frequencies, as shown by shading in the figure. Other objects captured in the second image 400 also include vehicles 440, 442, 444, 446, 448, 450, 452, 454, 456, 460, and 462. The taillights of vehicles 440 and 442 are lit with red frequency light, as shown by shading in the figure. Lights atop vehicle 454 and on the body of vehicle 454 are lit with red frequency light, as shown by shading in the figure. The lane of travel of the vehicle 100 is lane 402. Lanes 404 and 406 are for a same direction of travel as lane 402. Lanes 412 and 414 are for an opposite direction of travel as lane 402. Cross street 424 runs at least approximately perpendicular to the direction of travel as lane 402. Vehicle 440 is in lane 402, and vehicle 442 is in lane 404. Vehicles 444, 446, 450, 452, and 456 are in lane 412, while vehicles 448 and 454 are in lane 414. Vehicles 460 and 462 are in the cross street 424.

The vehicle's computing devices 110 may be configured to select one or more regions in the captured image according geometry of the roadway stored in the map information. The selected one or more regions may be areas where oncoming traffic is. The geometry of the roadway depicted in the captured image may be determined by projecting the geometry of various roadway features, such as lanes, curbs medians, etc., of the roadgraph into the captured image according to the pose of the vehicle 100 when the image was captured. Alternatively, the geometry of the roadway depicted in the captured image may be determined by detecting roadway features in the captured image and comparing them to the geometry of roadway features defined in the roadgraph.

Returning to FIG. 4A, given the pose of the vehicle when the second image was captured, the vehicle's computing devices 110 may determine the geometry of the roadway depicted in the first image 400 by projecting the geometry of various features of the roadgraph into the image and/or by detecting roadway features in the first image (for instance, using various image processing techniques) and comparing those features to the geometry of roadway features of the roadgraph. In this regard, the computing devices 110 may may detect lanes 402, 404, 406, 412, 414, lane lines 408, 410, 416, double lane lines 420, as well as other roadway features.

The roadway features may be used to identify lanes for a same direction as a lane of travel of the vehicle 100 and lanes for an opposite direction as the vehicle's lane of travel based on such information stored in the roadgraph. The lanes for the opposite direction may be part of a same road, or may be parts of different roads. The selected one or more regions may be areas of the image where the lanes for the opposite direction are.

Figure 3B:
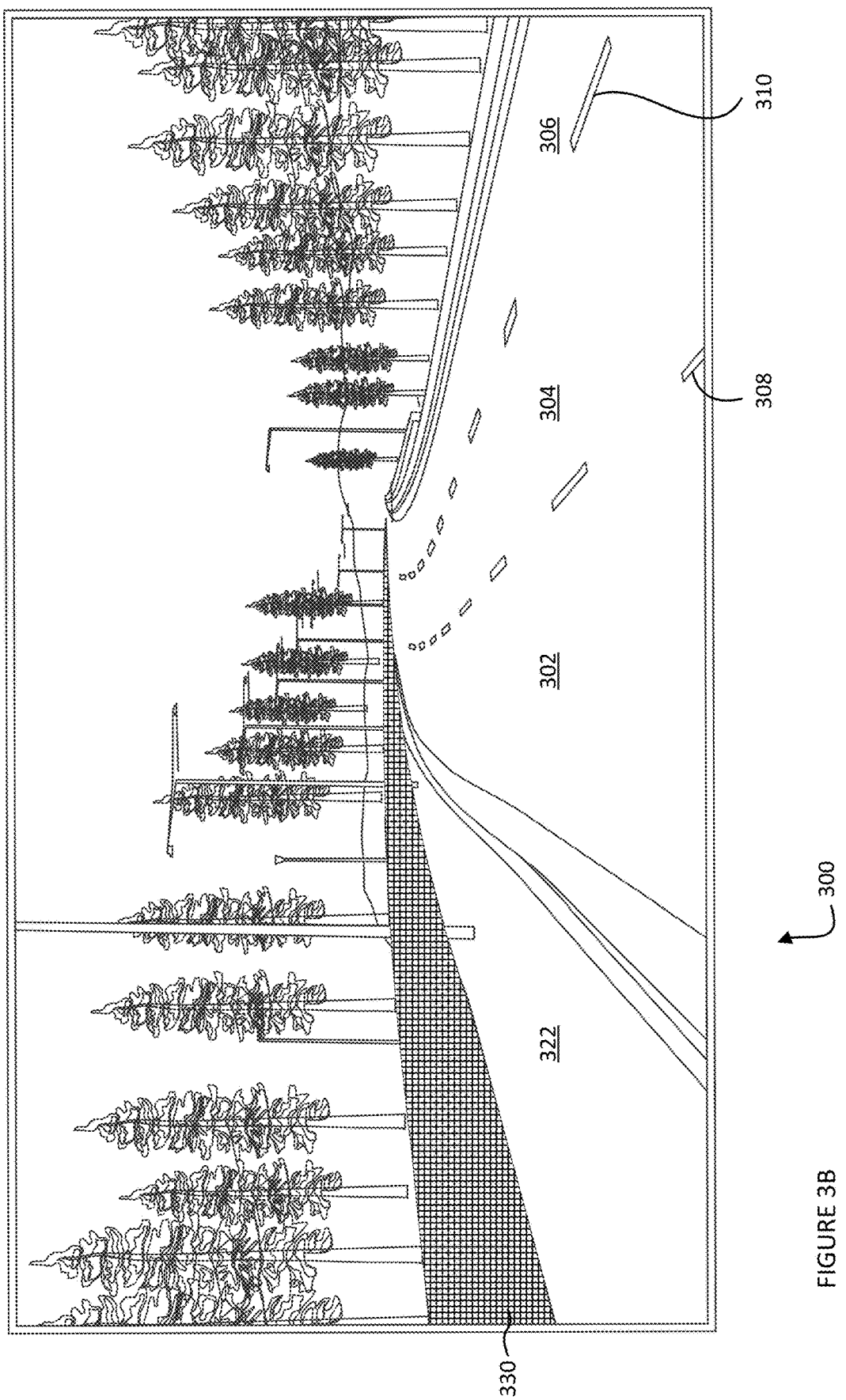

Returning to FIG. 3A, the vehicle's computing devices 110 may determine that lanes 312, 314, and 316 are for the opposite direction from lane 302 in which the vehicle 100 is currently traveling, or rather are for oncoming lanes of traffic, based on the physical location and type of the roadway feature of the median strip 322 and/or the direction of traffic of the lane 302 (in which the vehicle 100 is currently traveling) as compared to the directions of lanes 312, 314, 316 as identified in the roadgraph. As such, as shown in FIG. 3B, a region 330 in the example first image 300 may be selected by the vehicle's computing devices 110 in the first image 300. The vehicle's computing devices 110 may then define the region 330 based on the roadway features including the lanes 312, 314, and 316, lane lines 318 and 320, as well as median strip 322 that are visible in the first image 300 and/or information identified in the roadgraph. As a result, the region 330 is selected to be the area of the first image 300 including where lanes 312, 314, and 316 are.

Figure 4B:
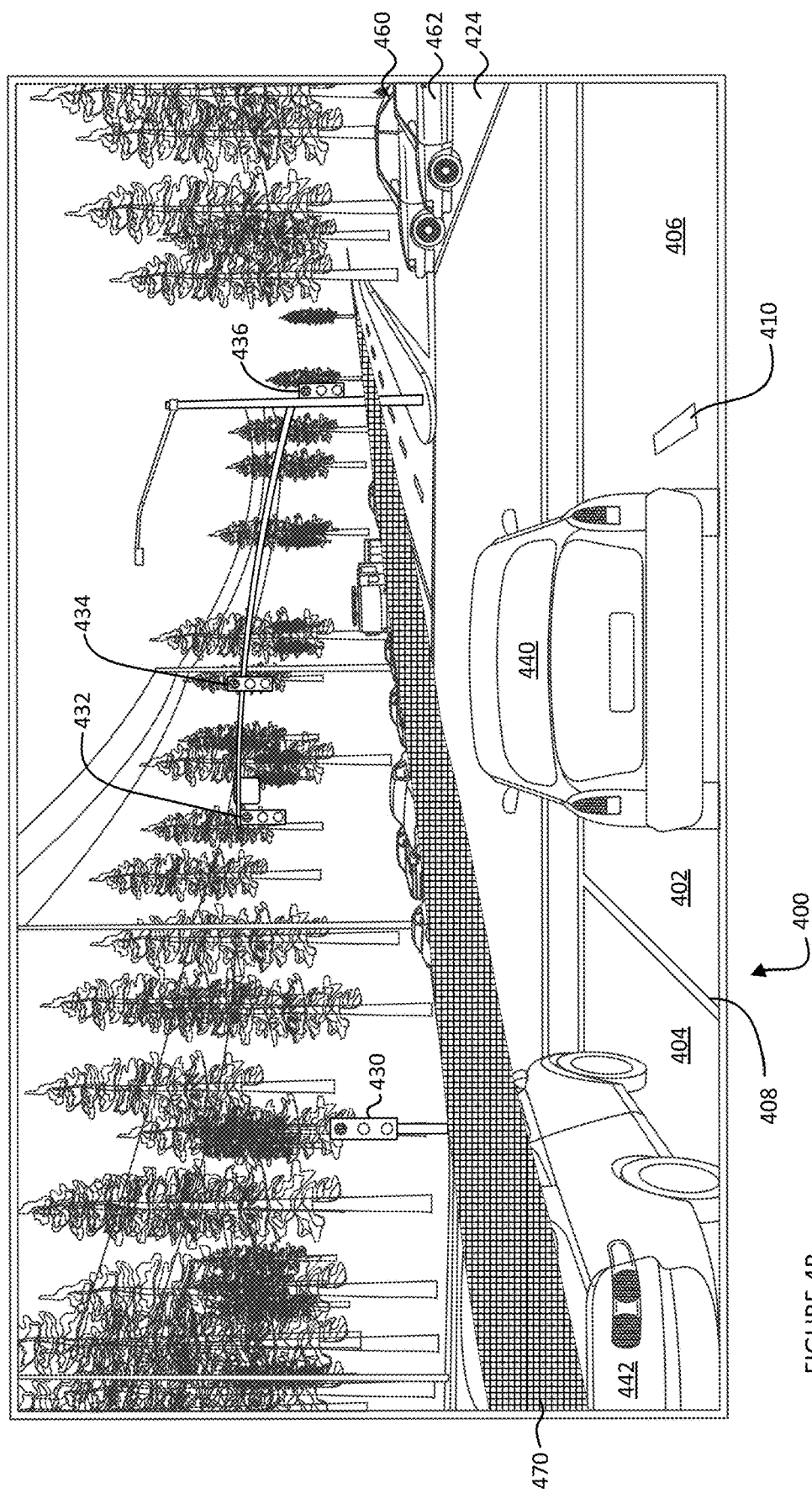

Turning to the example of FIG. 4B for the second image 400, a region 470 may be selected by the vehicle's computing devices 110. The vehicle's computing devices 110 may determine that lanes 412 and 414 are for the opposite direction from the vehicle's lane of travel 402 or oncoming traffic based on at least the location and type of the roadway feature of the double lane line 420. The vehicle's computing devices 110 may then define the region 470 based on the roadway features including the lanes 412, 414 and lane lines 416, 420. As a result, the region 470 is selected to be the area of the second image 400 including the areas where lanes 412 and 414 are visible in the second image.

The vehicle's computing devices 110 may then generate one or more gates, or areas of interest, in the selected one or more regions. Each gate may represent a region of interest at particular distances from the vehicle. Each gate may span at least a width of a road or roads containing the lanes for the opposite direction of traffic from the vehicle or oncoming traffic. A height of each gate may be based on an estimated emergency vehicle size, such as an average height of a tallest emergency vehicle. For example, the height of each gate may be 3.5 meters, or more or less. The height of each gate may be based on an expected maximum height of an emergency vehicle in the area. The one or more gates may be generated at regular distances, such as every 15 meters, or may be variable depending on a level of interest at particular distances. These distances may be determined using detected 3D geometry information or estimated based on the perspective of the captured image.

The one or more gates may be generated starting from where a range of the short-range sensors of the vehicle ends, such as 60 meters or more or less. The one or more gates may end at a distance where the lanes for the opposite direction of traffic from the vehicle become imperceptible in the image or where a nominal emergency vehicle would become smaller than a first threshold amount of pixels in the captured image. Alternatively, the one or more gates may end where a range of the long-range sensors of the vehicle ends, such as 150 meters. In another alternative example, the one or more gates may be generated by the vehicle's computing devices 110 or a remote computing device using known map information. The one or more gates may then be generated for the given road at particular locations in the map information. Distances between each gate may be a set road length on the given road.

Figure 3C:
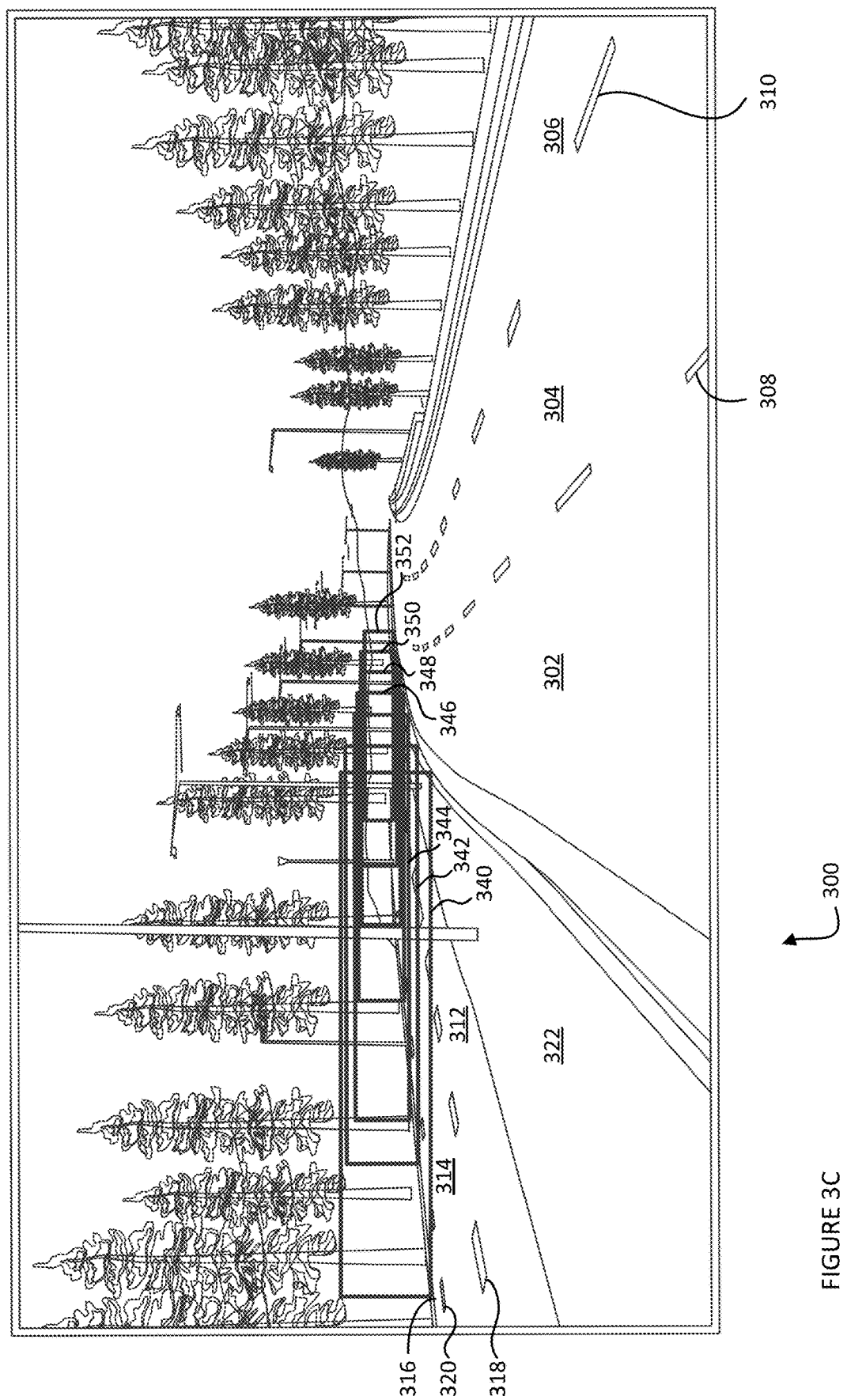

For example, as shown in FIG. 3C, a first gate 340, closest in the example first image 300, may span the width or lateral distance of three lanes 312, 314, 316, which are encompassed within the selected region 330, at a distance of 60 meters from the vehicle 100. Each subsequent gate, such as gates 342, 344, 346, 348, 350, and 352, may be determined for a distance that is 15 meters further from the previous gate. Each of the gates in the first image 300 in FIG. 3C may be approximately three (3) meters in height. From the perspective in the first image 300, each subsequent gate may appear to be shorter than the previous gate due to the increase in distance from the vehicle 100. The gates in the first image 300 continue until 150 meters, where the range of the long-range sensors ends.

Figure 4C:
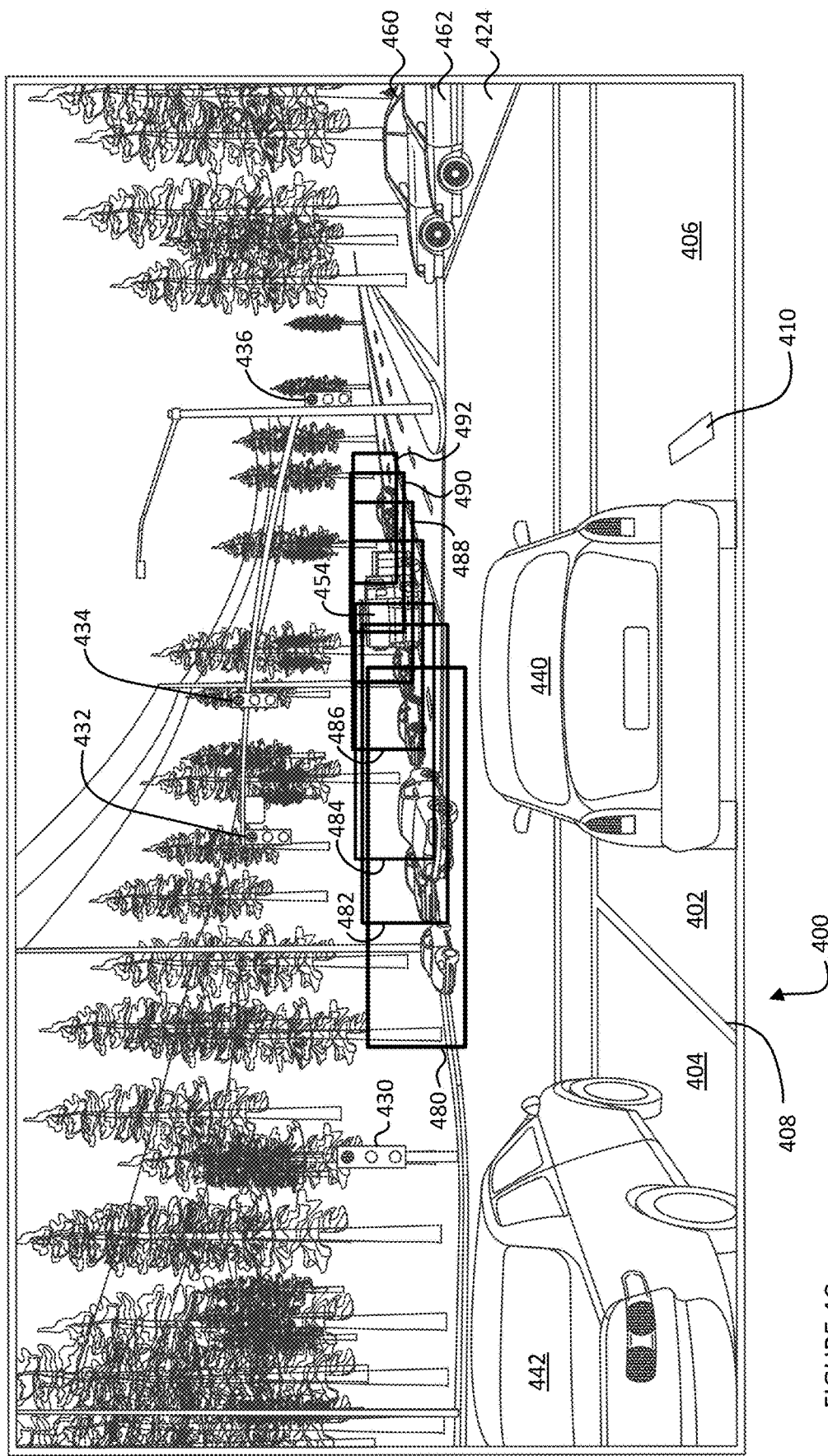

Turning to FIG. 4C for the example second image 400, a first gate 480 may be generated as a closest gate and may span width or lateral distance of the two lanes 412, 414, which are encompassed within the selected region 470, at a distance of 60 meters from the vehicle 100. Each subsequent gate, such as gates 482, 484, 486, 488, 490, and 492, may be determined for a distance that is 15 meters further from the previous gate. Each of the gates in the second image 400 in FIG. 4C may be approximately three (3) meters in height. From the perspective in the second image 400, each subsequent gate may appear to be shorter than the previous gate due to the increase in distance from the vehicle 100. The gates in the second image 400 continue until 150 meters, where the range of the long-range sensors ends.

Figure 5:
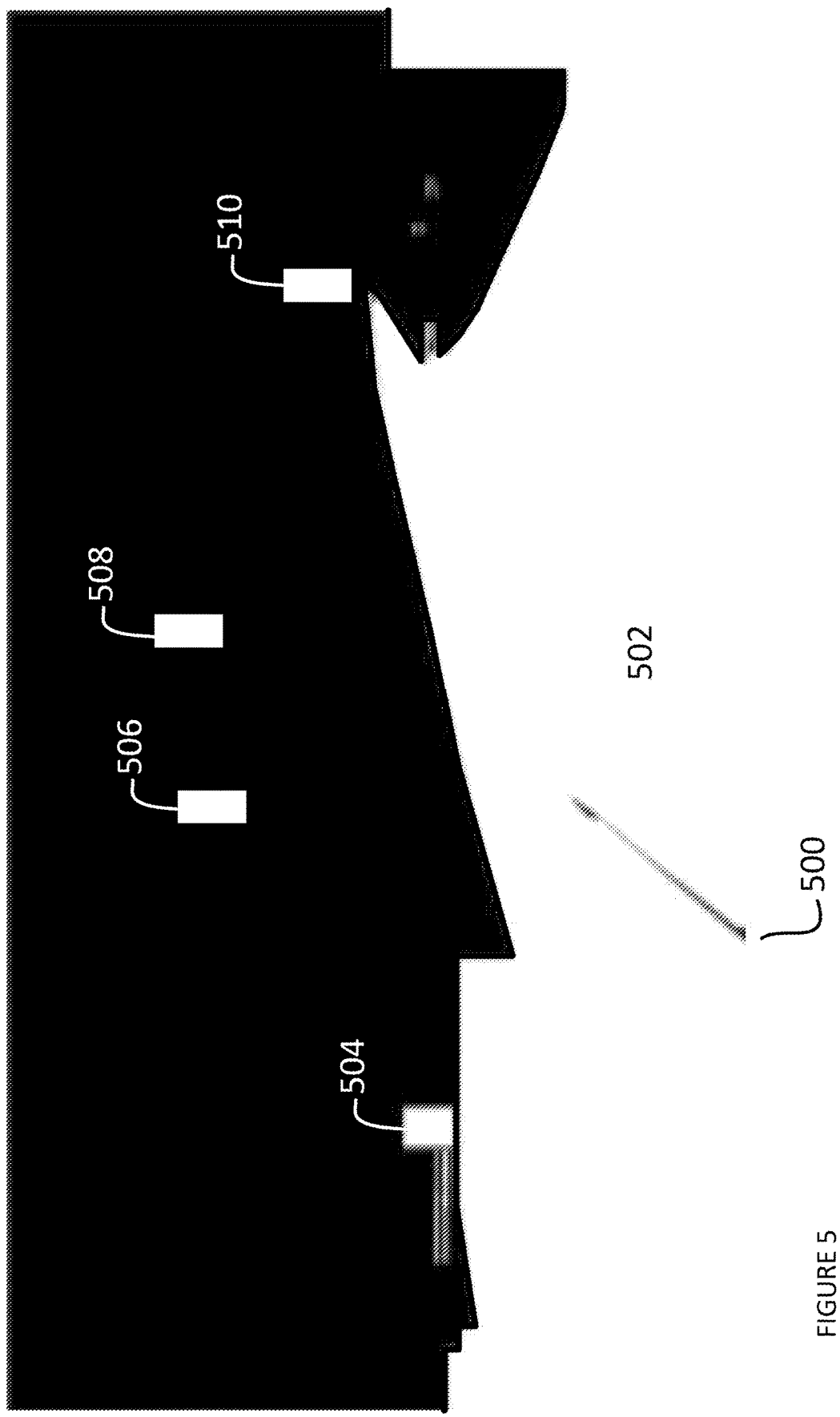
FIG. 5 shows an example output image 500 in accordance with aspects of the disclosure.

In some implementations, the vehicle's computing devices 110 may also mask pixels associated with objects that are not relevant to the detection of emergency vehicles. For example, objects that are not relevant may include traffic lights, vehicles traveling in a same direction as the vehicle 100, or other objects with blue lights and/or red lights or other frequencies of light that are typically associated with emergency vehicles, but that are not emergency vehicles. This image masking may be performed by classifying a detected object as an object that is not relevant, using 3D geometry information associated with the detected object to project the detected object into the captured image, and identifying pixels covered by the projection of the detected object as not relevant, or "masking" the pixels. As shown in FIG. 5, the second image 400 may be filtered to mask the pixels associated with objects such as traffic lights, lanes for travelling in the same direction as the vehicle, and vehicles travelling in the same direction. In particular, the traffic lights 430, 432, 434, 436, the lanes 402, 404, 406 that are for a same direction of travel as the vehicle 100, and the vehicles 440, 442 travelling in those lanes in the second image 400 may be masked as shown by white portions 502, 504, 506, 508, and 510 in output image 500.

After the one or more gates are generated, the vehicle's computing devices 110 may determine whether any red or blue lights are within the one or more gates. Red lights may include light having frequencies in a range of approximately 405-480 THz. Blue lights may include light having frequencies in a range of approximately 620-680 THz. Determining whether any red or blue lights are within the one or more gates may include filtering the captured image for the red light frequencies or blue light frequencies. While the example method described herein discusses red and/or blue lights, the method may also be performed for other frequencies of light that may be associated with an emergency vehicle or other type of vehicle that may require a particular response from the vehicle 100.

Figure 6A:
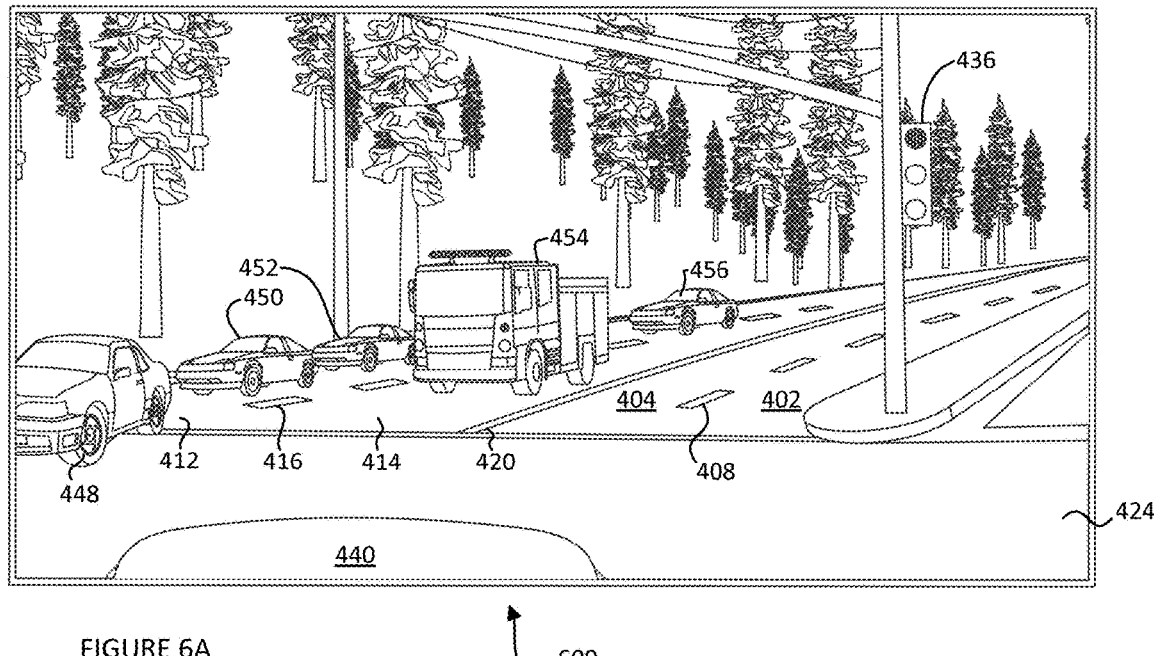
FIGS. 6A and 6B show a cropped image portion 600 in accordance with aspects of the disclosure.

For example, in FIG. 6A, a cropped image portion 600 of the second image 400 captured by the image capture device of the perception system 172 is shown. Objects depicted in the cropped image portion 600 include roadway features such as lanes 402, 404, 412, 414, lane lines 408, 416, 420, cross street 424, and traffic lights 436, among others. Objects depicted in the cropped image portion 600 also include a portion of vehicles 440, 448 and vehicles 450, 452, 454, 456.

Figure 6B:
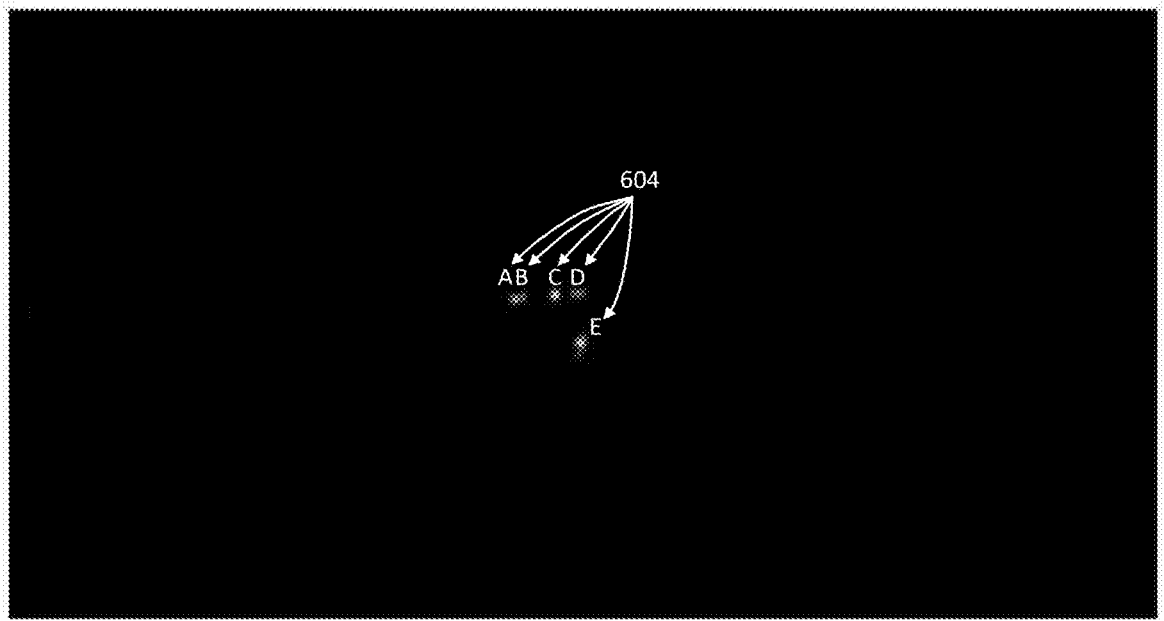

As shown in FIG. 6B, the cropped image portion 600 may be filtered based on red light frequencies to identify red lights as shown in output image 602. In the output image 602, a plurality of red lights 604 that are on or around vehicle 454 is shown in contrast to the rest of the cropped image portion 600. The plurality of red lights 604 includes lights A, B, C, D, and E, where lights A-D appear across a top of vehicle 454 and light E appears on a body of vehicle 454. The red lights on traffic light 436 are not shown in the output image 602 as the traffic light 436 was masked, as shown in FIG. 4B. While only the cropped image portion 600 is shown, the filtering process may be performed for the entirety of image 400. The same filtering process may be applied to the image 400 based on blue light frequencies to identify the blue lights in the image.

In some examples, the captured image may be filtered by the vehicle's computing devices 110 using a center-surround filter to detect where sharp color contrasts exist in the one or more gates to identify where there may be colored lights prior to or in place of filtering by frequency. In addition, the captured image may be filtered based on light energy to identify where there may be bright lights prior to or in place of filter by frequency. Furthermore, determining whether any red or blue lights are within the one or more gates may additionally or alternatively include identifying or labeling red or blue lights within the one or more gates. The identifying or labeling may be performed using a deep network or other type of machine learning method.

The vehicle's computing devices 110 may then identify a candidate emergency vehicle corresponding with a group of red and/or blue lights in a given gate of the one or more gates. The group of red and/or blue lights may be a plurality of red and/or blue lights within the given gates that are in close proximity with or within a threshold distance of one another, such as within one (1) meter or more or less of one another. Identifying the candidate emergency vehicle may include generating a first candidate vehicle polygon according to the group of red and/or blue lights and the given gate. A vehicle that is captured in or captured more than 50% in the first candidate vehicle polygon may be identified as the candidate emergency vehicle. The size of the first candidate vehicle polygon may be the estimated or average width and height of an emergency vehicle. Alternatively, the width may be same or similar to the width of the group of red and/or blue lights or the height may be same or similar to the height of the given gate. In addition, the size of the first candidate vehicle polygon generated in the captured image may correspond with the distance or the dimensions of the given gate, such as having a same or similar distance from the vehicle or a same or similar height as the given gate. The position of the first candidate vehicle polygon may also correspond with the position of the group of red or blue lights. Namely, the first candidate vehicle polygon may be positioned so that the first candidate vehicle polygon encompasses the group of red and/or blue lights. Additional candidate emergency vehicles may be identified in the captured image in a same or similar manner.

Figure 7:
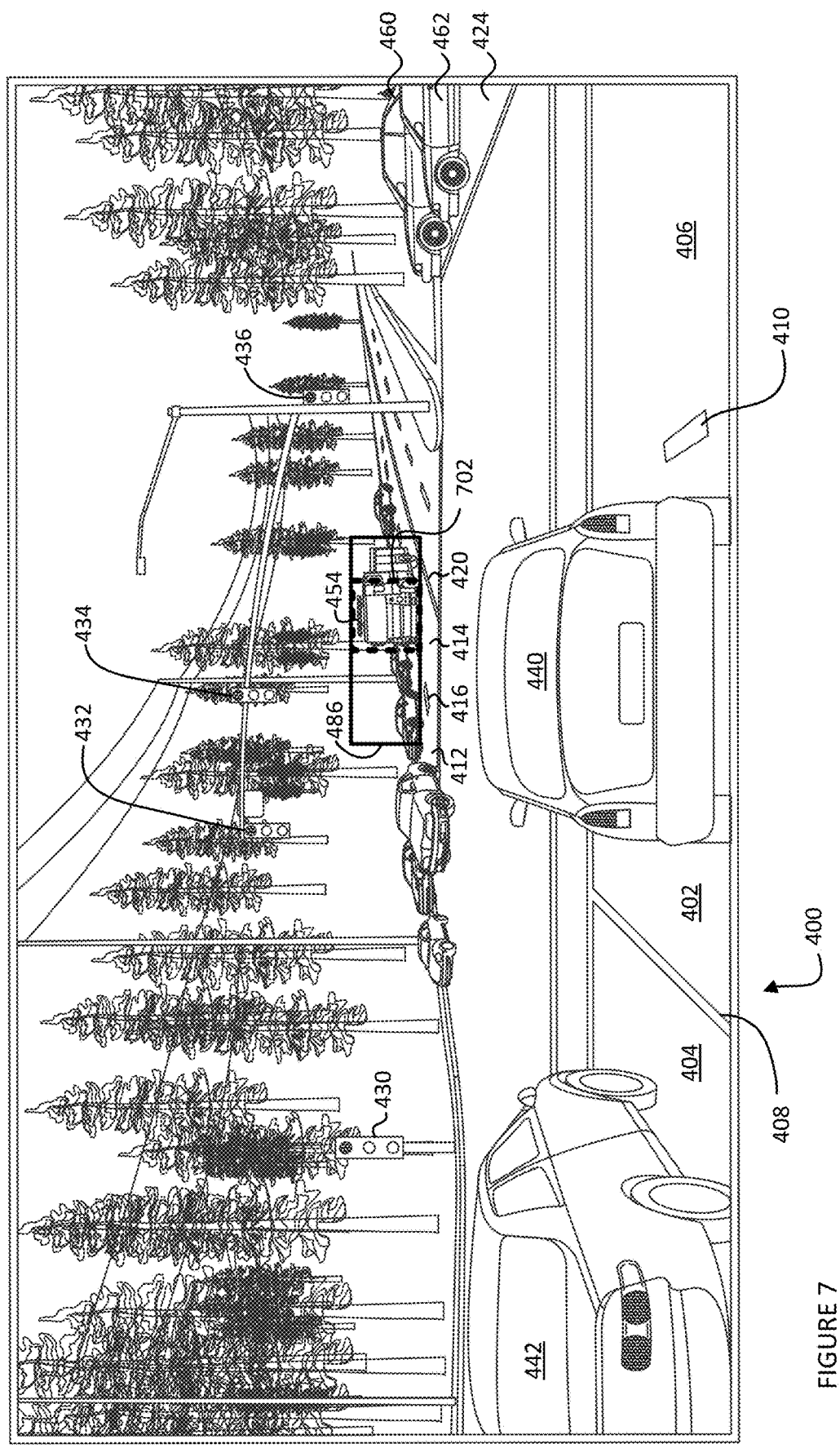
FIG. 7 shows the example image 400 in accordance with other aspects of the disclosure.

As shown in FIG. 7, a first candidate vehicle polygon 702 (depicted herein as a box or rectangle, though other polygons with more or less vertices may be used) may be generated based on a group of red lights identified in output image 602. Red lights A, B, C, and D shown in FIG. 6B may be identified as a group by the vehicle's computing devices 110 as a group based on each light being within one (1) meter of at least one other light in the plurality of red lights 604. Red light E may not be identified as part of the group because it is greater than one (1) meter from each of lights A, B, C, and D. The first candidate vehicle polygon 702 has a width that encompasses the width of the group of red lights A-D and has a height that is the same as the height of gate 486. The vehicle 454 is captured completely in the first candidate vehicle polygon 702 and is therefore identified as the candidate emergency vehicle.

Identifying the candidate emergency vehicle may additionally include determining whether additional red and/or blue lights are in one or more additional images taken before and/or after the captured image. Using the one or more additional images may be included in order to capture a flashing light. The one or more additional images may be taken within one (1) second of the captured image. The additional red and/or blue lights may be determined in the one or more additional images in a same or similar way as described above, including selecting one or more regions and generating one or more gates. The additional red and/or blue lights in the one or more additional images may be used by the vehicle's computing devices 110 to (i) generate one or more aggregated output images to generate a more accurate candidate vehicle polygon, and/or (ii) verify the first candidate vehicle polygon.

In some implementations, the one or more aggregated output images may be generated using the captured image and the one or more additional images to increase an amount of light energy for detection purposes or to increase location accuracy of the candidate vehicle polygon. Increasing the amount of detectable light energy may result in higher vehicle detection scores for an emergency vehicle. For example, the red and/or blue lights from the captured image and those from at least one of the one or more additional images may be combined in an aggregated output image. Multiple aggregated output images may be generated, such as a first aggregated output image generated from a first group of images taken within a first period of time and a second aggregated output image generated from a second group of images taken with a second period of time subsequent to (or immediately after or partially overlapping with) the first period of time. Each of these period of time may be relatively brief, for instance on the order of 0.5 seconds or more or less. A group of red and/or blue lights may be detected in each aggregated output image, and a candidate emergency vehicle box may be generated corresponding with this group in addition to or in place of the first candidate vehicle polygon. The candidate vehicle polygon may be generated for the candidate emergency vehicle in each aggregated output image in a same or similar way to the first candidate vehicle polygon for the captured image described above.

Figure 8:
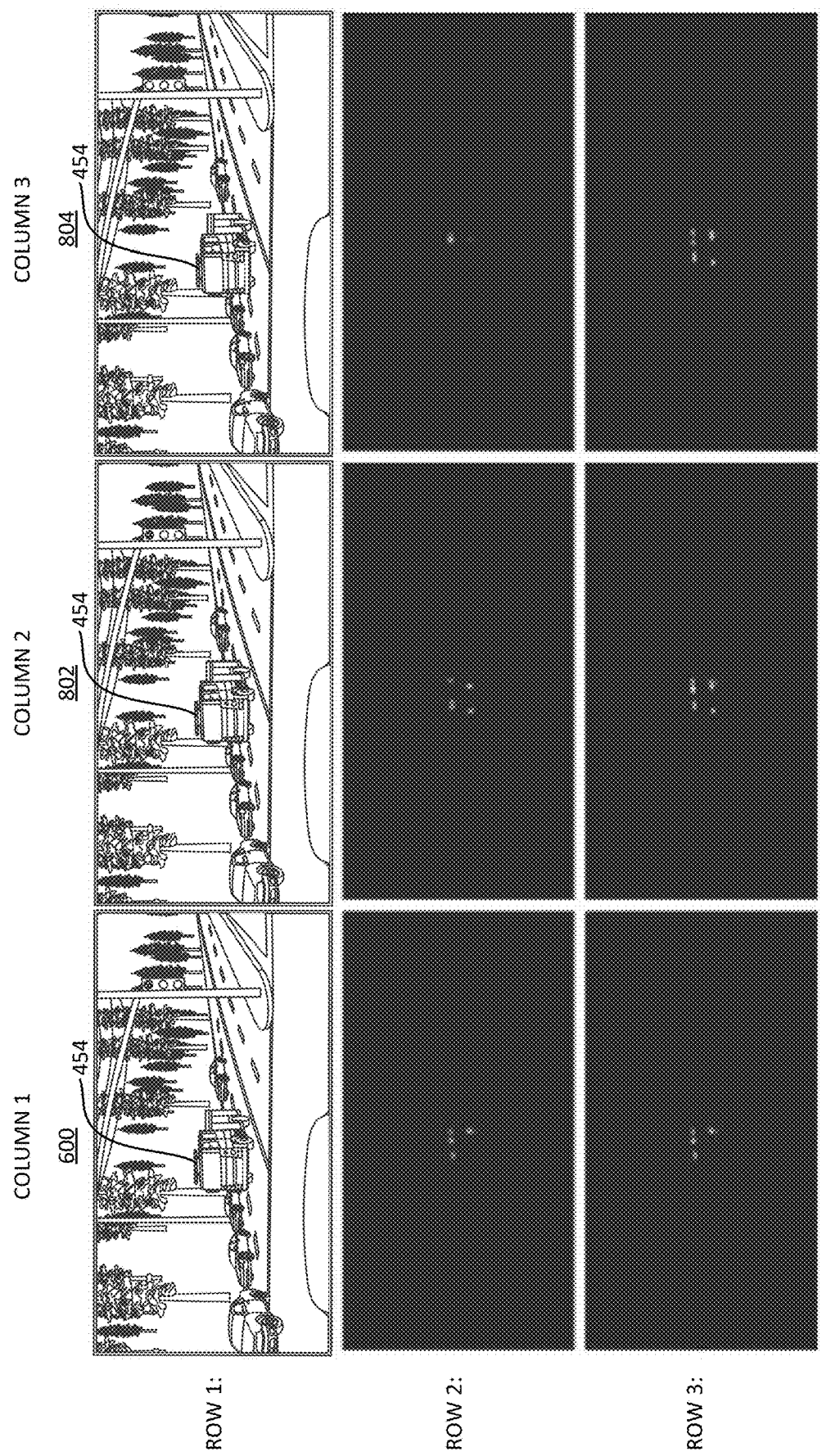
FIG. 8 shows a series of images in accordance with aspects of the disclosure.

As shown in FIG. 8, column 1 shows perspectives of the image portion 600 of the example second image 400; column 2 shows perspectives of an image portion 802 of a first additional image taken subsequent to the image 400; and column 3 shows perspectives of an image portion 804 of a second additional image taken subsequent to the first additional image. The capture times of the example second image 400 and the first additional image may be within a tenth of a second, and the capture times of the first additional image and the second additional image may be within a tenth of a second. The image portions 802, 804 of the first and second additional images may show approximately the same geographic area as image portion 600 of the example second image 400. In particular, each of image portions 600, 802, and 804 may show vehicle 454. As captured in the image portions, the lights atop vehicle 454 and on the body of the vehicle 454 may be lit in different patterns.

Row 1 in FIG. 8 shows the raw input for each image portion, and row 2 shows the filtered red light output for each image obtained as described with respect to FIGS. 6A and 6B. Row 3 shows the accumulated light output as the filtered red light output is added together. The output image in column 1 of row 3 is the same as that of column 1 of row 2. The output image in column 2 of row 3 is an aggregated output image showing the sum of the light output from output images in columns 1 and 2 of row 2. The output image in column 3 of row 3 is an aggregated output image showing the sum of the light output from output images in columns 1, 2, and 3 of row 2. The red light output from the aggregated output image in column 3 of row 3 may be used to generate the first candidate vehicle polygon 702 as described above in place of that of the output image 602.

In some instances, each candidate vehicle polygon may be verified or rather compared to another candidate vehicle polygon in order to confirm that the candidate vehicle polygon is an active emergency vehicle. To verify the first candidate vehicle polygon, an additional candidate vehicle polygon may be generated according to the additional red and/or blue lights for each of the one or more additional images. The first candidate vehicle polygon in the captured image may be verified when at least one additional candidate vehicle polygon in at least one of the one or more additional images corresponds with the same candidate emergency vehicle as the first candidate vehicle polygon. When the first candidate vehicle polygon and an additional candidate vehicle polygon correspond with the same candidate emergency vehicle, an association between the candidate vehicle polygones may be created by the vehicle's computing devices 110. The vehicle's computing devices 110 may then use the associated candidate vehicle polygones to track the behavior of the candidate emergency vehicle over time. The tracked behavior may include, for example, flashing lights, change in heading, movement, etc.

The verification may be performed by projecting the at least one additional candidate vehicle polygon into the captured image. Projecting the at least one additional candidate vehicle polygon into the captured image may include aligning the at least one additional candidate vehicle polygon in the captured image based on (i) the size and position of the at least one additional candidate vehicle polygon and (ii) a relative motion of the vehicle between the captured image and the corresponding at least one additional image. A given additional image of the at least one additional image may be associated with the captured image when a measure of similarity exceeds a second threshold amount. The measure of similarity may be determined based on an amount of physical intersection between the first candidate vehicle polygon and a given additional candidate vehicle polygon of the at least one additional candidate vehicle polygon that is projected into the captured image. For example, the measure of similarity may be determined using Jaccard index, or the intersection-over-union, for the first candidate vehicle polygon and the given additional candidate vehicle polygon.

Figure 9:
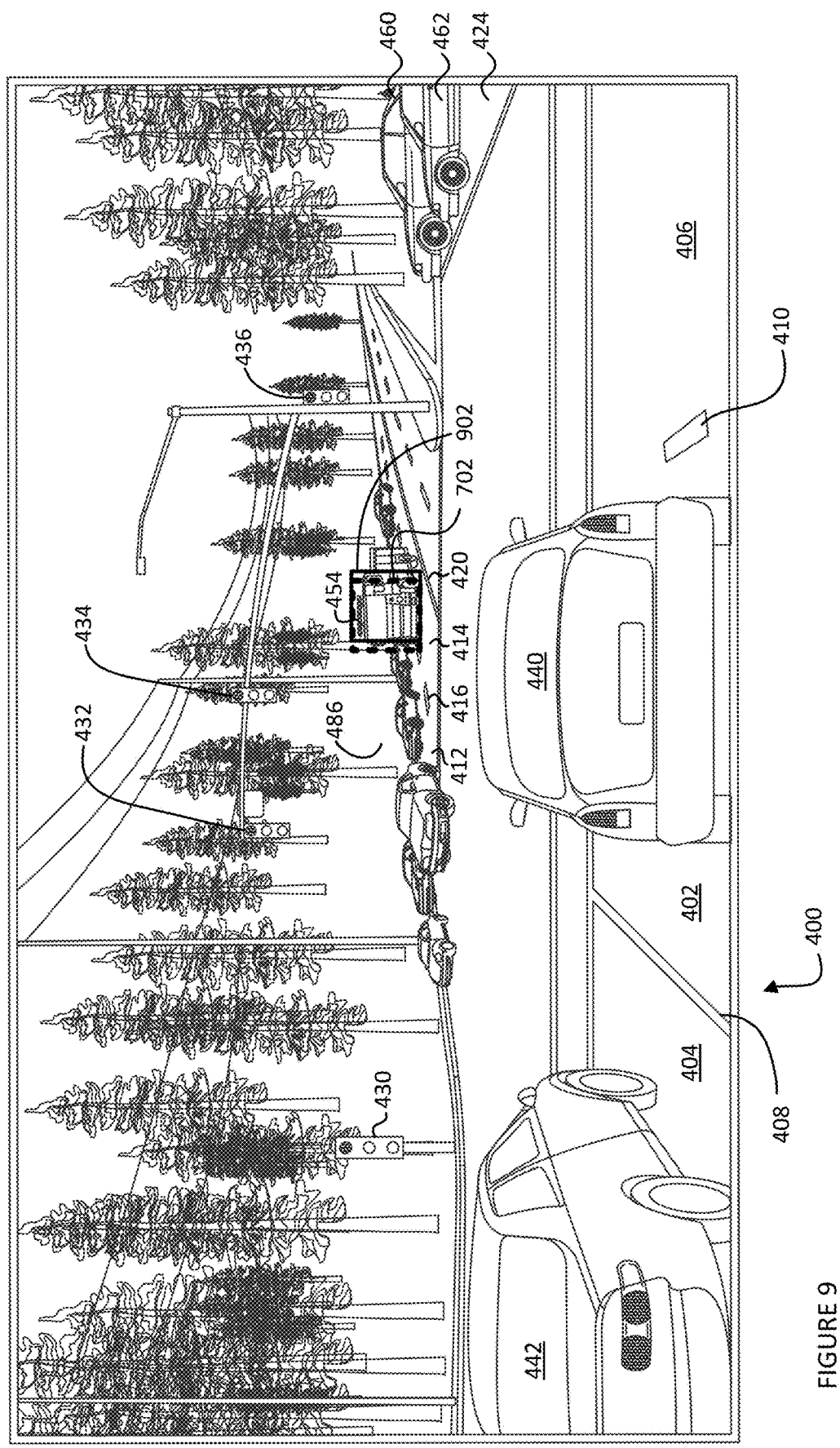
FIG. 9 shows the example image 400 in accordance with further aspects of the disclosure.

As shown in FIG. 9, the example second image 400 has an additional candidate vehicle polygon 902 projected into the second image in addition to the candidate vehicle polygon 702 generated with respect to FIG. 7. The additional candidate vehicle polygon 902 may have been generated for an image previously captured by the image capture system of the perception system 172. The previously captured image may have been captured within a tenth of a second of the second image 400. Alternatively, other candidate vehicle polygones from an image captured either one second before or after the second image 400 may be used. The vehicle's computing devices 110 may determine an measure of similarity between the candidate vehicle polygones 702 and 902 using the Jaccard index. The measure of similarity between the candidate vehicle polygones 702 and 902 is high given that most of candidate vehicle polygon 902 overlaps candidate vehicle polygon 702. The vehicle's computing devices 110 may determine that the measure of similarity is greater than the second threshold amount, and verify the candidate vehicle polygon 702. The vehicle's computing devices 110 may also create an association between the candidate vehicle polygon 702 and candidate vehicle polygon 902 for tracking purposes.

After verifying the first candidate vehicle polygon with the at least one additional candidate vehicle polygon, the vehicle's computing devices 110 may determine the candidate emergency vehicle is an active emergency vehicle. In some examples, the candidate emergency vehicle may be determined as active when the candidate emergency vehicle has flashing lights. This determination may include comparing the red and/or blue lights in the first candidate vehicle polygon with the red and/or blue lights in the at least one additional candidate vehicle polygon. A difference in a number of lights, an intensity of lights, or a position of lights may be an indication that the candidate emergency vehicle has flashing lights.

For example, the first candidate vehicle polygon and the at least one additional candidate vehicle polygon may be aligned based on features in the first candidate vehicle polygon and the at least one additional candidate vehicle polygon, such as position of anchor lights or other parts of the candidate emergency vehicle. An measure of similarity between light energy in the first candidate vehicle polygon and the at least one additional candidate vehicle polygon may be determined, such as by taking the sum of absolute differences between the candidate vehicle polygones or comparing a maximum of total light energy in each candidate vehicle polygon. When the measure of similarity is less than a third threshold amount, the candidate emergency vehicle may be determined to have flashing lights and therefore be active.

Figure 10:
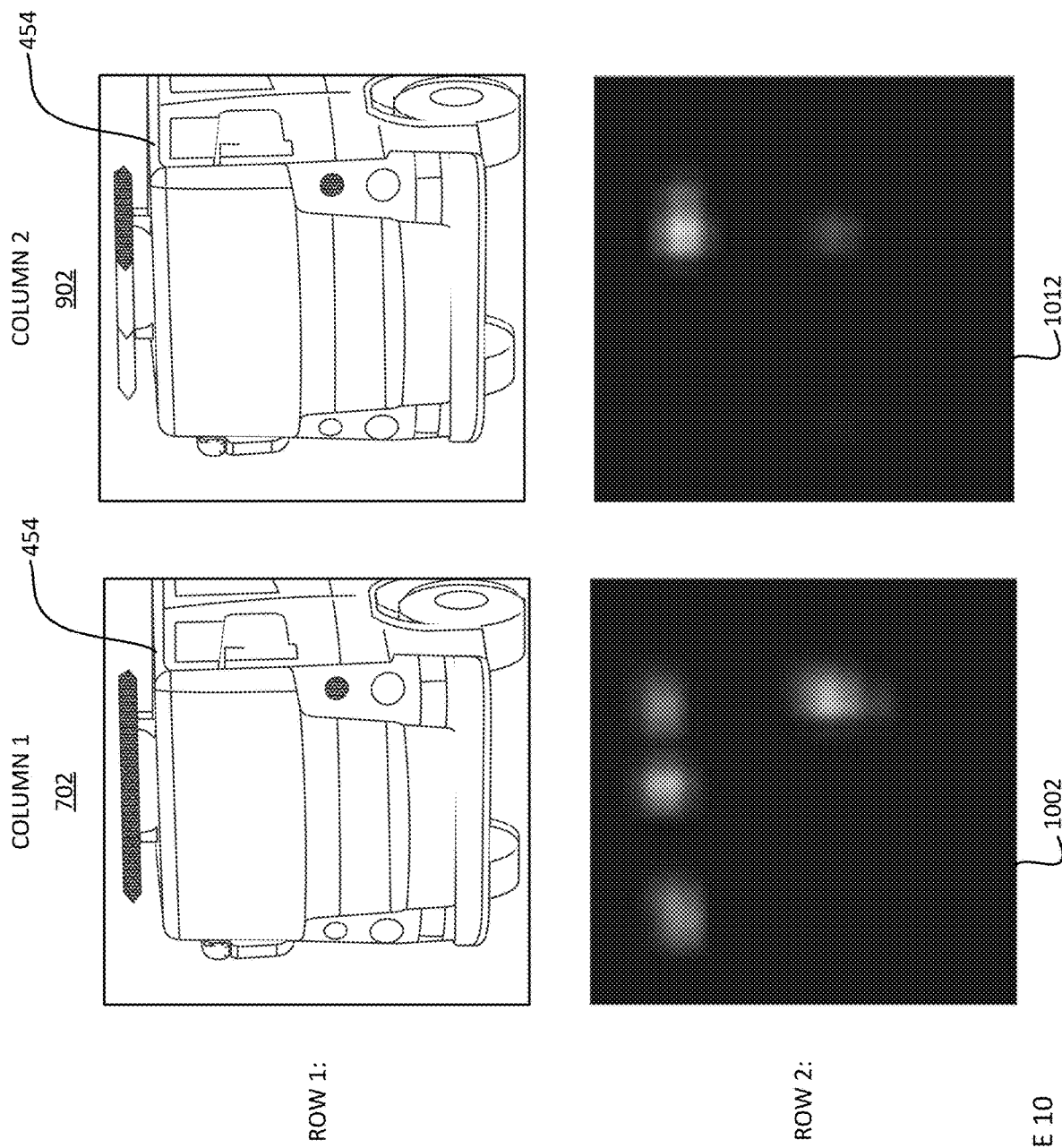
FIG. 10 shows another series of images in accordance with aspects of the disclosure.

In FIG. 10, a series of images are shown depicting candidate emergency vehicles according to aspects of the disclosure. Column 1 of row 1 shows the portion of the example second image 400 showing candidate emergency vehicle 454 in first candidate vehicle polygon 702. Column 2 of row 1 shows the portion of the previously captured image showing candidate emergency vehicle 454 in additional candidate vehicle polygon 902. The lights atop and on the body of candidate emergency vehicle 454 in additional candidate vehicle polygon 902 may be lit in a different pattern than in column 1, as shown by shading. The filtered output 1002 for the portion of the example second image and the filtered output 1012 of the previously captured image are shown, respectively, in columns 1 and 2 of row 2. The filtered output may be obtained from filtered output images. For example, filtered output 1002 may be obtained from output image 602. The vehicle's computing devices 110 may compare the filtered outputs 1002 and 1012 and determine that the measure of similarity between the total light energy in filtered output 1002 and that of filtered output 1012 falls below the third threshold amount. The vehicle's computing devices 110 may therefore determine that the candidate emergency vehicle 454 is an active candidate emergency vehicle.

In some implementations, determining the candidate emergency vehicle is an active emergency vehicle may also validate the candidate emergency vehicle. Validation may include removing possible false positives, such as by checking characteristics of the active candidate emergency vehicle against those of other detected objects and/or confirming detection of an object at the location of the candidate emergency vehicle using data from a sensor other than the camera, etc. In order to remove false positives, the vehicle's computing devices 110 may filter out objects detected in a given image based on features of those detected objects that are detected by other systems of the vehicle (e.g. different sensors and/or processing systems of the perception system) that are uncharacteristic of an active emergency vehicle or unreliable indicators of an active emergency vehicle. The features may include when another detected object is (i) stationary, (ii) a non-vehicle, (iii) an unidentifiable object moving at less than 1 meter/second, (iv) within a minimum distance from the vehicle, (v) cut off by an edge of an image, or (vi) has heading that is greater than 60 degrees from a directly oncoming heading relative to the vehicle.

The vehicle's computing devices 110 may then discard the candidate emergency vehicle as a false positive when there is a detected object used to validate the candidate emergency vehicle that is uncharacteristic of an active emergency vehicle. For example, when the detected object used to validate the candidate emergency vehicle has a heading that is not oncoming relative to the vehicle, the candidate emergency vehicle may be discarded as a false positive. For example, the heading may be determined as not oncoming when it is greater than 60 degrees from the directly oncoming heading. Using the heading to filter out non-oncoming vehicles, especially non-oncoming vehicles on a curved road where taillights of the non-oncoming vehicles may be captured by the detection system within the one or more gates. Filtering out detected objects may also include projecting a location of a detected object that is filtered out in a previously taken image to a more recently taken image and filtering out an object in the more recently taken image that is in the projected location.

As another example verification, the detection of an object at the location of the candidate emergency vehicle may be confirmed using data from a sensor other than the camera, etc. For instance, data from a radar sensor, even with high noise, can be used to confirm the distance to an object and location. This may provide confirmation for objects beyond the perception range of other sensors, such as LIDAR sensors.

In other instances, validating the candidate emergency vehicle may include determining a validation score for the detected object. For each additional piece of information or signal that indicates that a candidate emergency vehicle is an active emergency vehicle, such as in any of the examples described above, the validation score for that candidate emergency vehicle may be increased. Similarly, for each additional piece of information or signal that indicates that a candidate emergency vehicle is not an active emergency vehicle (e.g. any of the false positive features in the examples above), the validation score for that candidate emergency vehicle may be decreased. As an example of this, in some instances, orange flags flapping in the wind can look like flashing lights, tail lights of other vehicles that look flashing because they are sporadically occluded, etc.

This validation score for a candidate emergency vehicle may be compared to one or more thresholds. For instance, only when a validation score reaches a certain minimum value is the candidate emergency vehicle "published" or that is used by various systems of the vehicle 100, such as the navigation system 168 in order to determine how to control the vehicle. In addition or alternatively, the score may be used by the navigation system 168 in order to determine whether to simply ignore the candidate emergency vehicle. For instance, depending upon the location relative to some map feature, distance from vehicle 100, speed, predicted future trajectory, even relatively high validation scores may be ignored. At the same time, given these same considerations, relatively low validation scores may also be treated as something that the vehicle 100 should respond to. For example, it may be less important to respond to a candidate emergency vehicle given the location of a median strip as in the example of the first image 300 even if the validation score for a candidate emergency vehicle is relatively high (e.g. the candidate emergency vehicle would be unlikely to enter into lane 302 or otherwise directly interact with vehicle 100), whereas it may be more important to respond to a candidate emergency vehicle proximate to an intersection as in the example of second image 400 even if the validation score for the candidate emergency vehicle 454 is relatively low given the possibility of the vehicle 100 needing to interact with the candidate emergency vehicle 454.

In some instances, features of objects detected by the perception system may be estimated by the vehicle's computing devices 110 and assigned to or used to characterize the candidate emergency vehicle. In particular, the location of objects may be detected using a noisy sensor in the perception system, such as a radar sensor which is more reliable in the longitudinal dimension than the lateral dimension. The location may be estimated by computing an error, such as an error ellipse in three-dimensions. The error ellipse for a given detected object may be determined based on smooth coordinates of the given detected object and corresponding covariance estimates. The estimated location may be projected into the given image to generate a bounding box. The vehicle's computing devices 110 may then determine whether a center of the candidate emergency vehicle falls within the bounding box of the given detected object. When the center falls within the bounding box, a score for the given detected object may be increased. In some implementations, the score may be a count that increases by one when the center falls within the bounding box. In addition, the count may be reduced or even reset when the candidate emergency vehicle is not within bounding box of the detected object. In other examples, a more general test for whether the center fails within the bounding box, such as one that takes into account the noise characteristics of the alternate sensor used to generate the measurement, may be used. The detected object having the greatest score for the candidate emergency vehicle may be used to characterize the candidate emergency vehicle. For instance, the distance, speed, heading, or other determined or detected features of the detected object having the greatest validation score may be assigned to the candidate emergency vehicle.

After determining the candidate emergency vehicle is an active emergency vehicle, the vehicle's computing devices 110 may operate the vehicle according to characteristics of the active emergency vehicle. Characteristics may include a location, a motion, a speed, or a predicted route of the active emergency vehicle. The vehicle's computing devices 110 may identify characteristics of the active emergency vehicle based on characteristics of the one or more candidate vehicle polygons or the one or more gates corresponding to the vehicle determined to be the active emergency vehicle. For example, the distance and location of the active emergency vehicle 454 may be a same distance and location relative the vehicle 100 as the distance and location of the candidate vehicle polygon 702 or another most current candidate vehicle polygon. Operating the vehicle may include providing these characteristics to the navigation system to enable the navigation system to generate a trajectory that yields to or otherwise avoids the active emergency vehicle, controlling the steering system to steer away from or around the active emergency vehicle, controlling the deceleration system to slow to a future stop, and/or other actions to properly respond to the active emergency vehicle.

While the examples herein relate to detections of emergency vehicles in oncoming lanes of traffic, occasionally emergency vehicles might travel in the same lane of travel, but in the opposite direction. For example, at the intersection depicted in the second image 400, if there was a vehicle between the candidate emergency vehicle 454 and the intersection, the driver of the emergency vehicle may decide to enter into lane 402 in order to go around that other vehicle. In this regard, similar features may be used to detect candidate emergency vehicles in non-oncoming lanes of traffic (e.g. those that are traveling in the same general direction as the lane in which the vehicle 100 is currently traveling. However, in such circumstances, it may be difficult to differentiate between taillights of other vehicles and therefore, there may be significantly more false positives.

Figure 11:
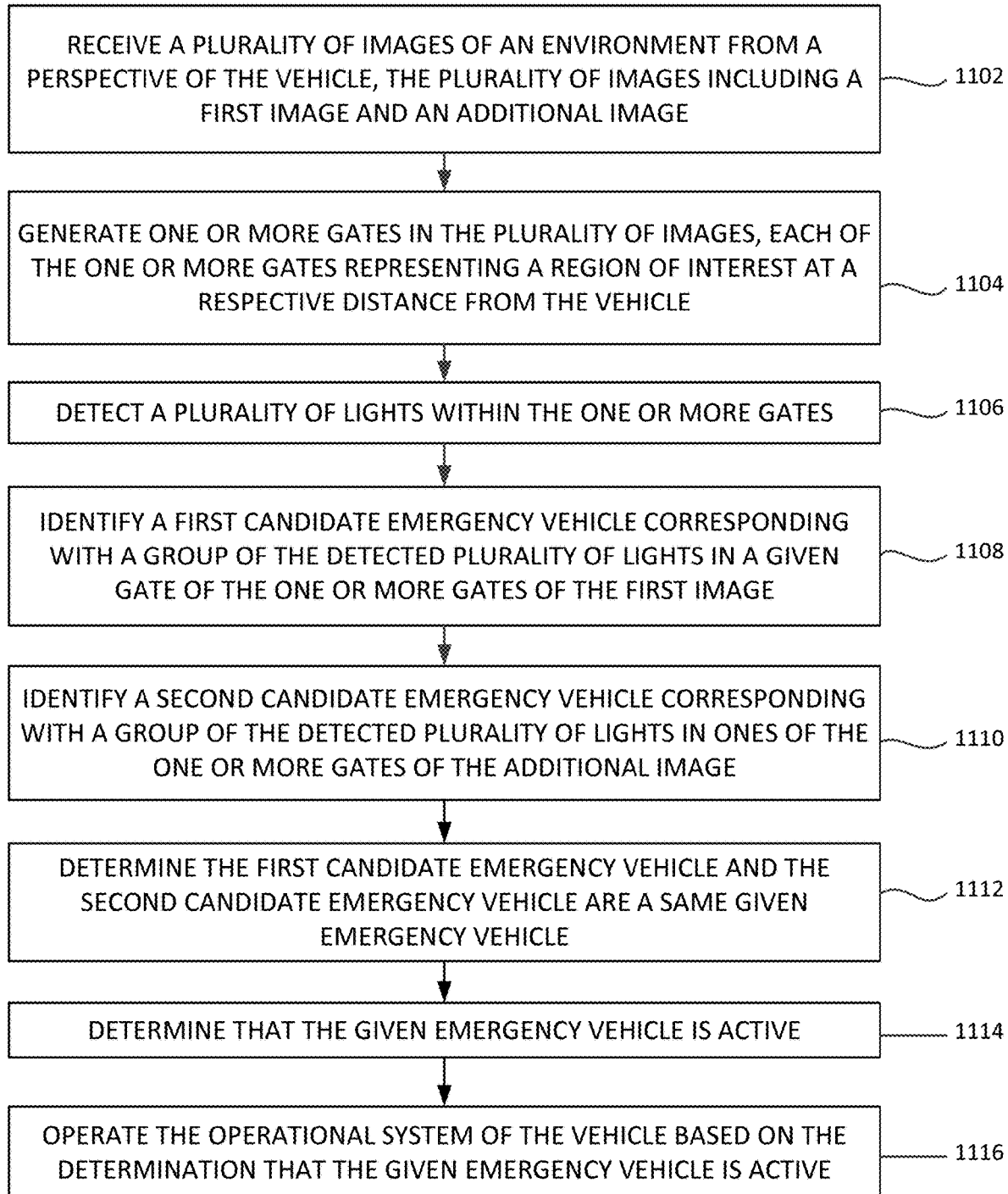
FIG. 11 is a flow diagram 1100 of an example method in accordance with aspects of the disclosure.

FIG. 11 shows an example flow diagram in accordance with aspects of the disclosure. More specifically, FIG. 11 shows a flow of an example method for detecting emergency vehicles performed by the vehicle's computing devices 110. Alternatively, one or more of the steps in the example method may be performed by one or more computing devices remote from the vehicle 100.

At block 1102, a plurality of images of an environment from a perspective of the vehicle are received. The plurality of images may include a first image, such as image 400 shown in FIG. 4A, and an additional image. The first and additional images may be captured using an image capture system of the autonomous vehicle. At block 1104, one or more gates are generated in the plurality of images. Each of the one or more gates represents a region of interest at a respective distance from the vehicle. For example, for image 400, gates 480, 482, 484, 486, 488, 490, and 492 may be generated as shown in FIG. 4C. Each of the one or more gates represents a region of interest at a given distance from a perspective of each image of the plurality of images. At block 1106, a plurality of lights is detected within the one or more gates. For instance, red and/or blue lights may be detected within the one or more gates. For example, red lights A-E may be detected in image 400 as shown in FIGS. 6A-6B.

At block 1108, a first candidate emergency vehicle corresponding with a group of the detected plurality of lights is identified in a given gate of the one or more gates of the first image. In image 400, vehicle 454 may be identified as a candidate emergency vehicle. At block 1110, a second candidate emergency vehicle corresponding with a group of the detected plurality of lights is identified in ones of the one or more gates of the additional image. The second candidate emergency vehicle may be identified using a same method as for the first candidate emergency vehicle. At block 1112, the first candidate emergency vehicle and the second candidate vehicle may be determined to be a same given emergency vehicle. For example, the vehicle 454 in image 400 may be determined to be the candidate emergency vehicle identified in the image 400 as well as in the previously captured image. At block 1114, the given emergency vehicle may be determined to be active. At block 1116, an operational system of the autonomous vehicle may be operated based upon the determination that the given emergency vehicle is active. For example, the operational system may be operated to yield to the active emergency vehicle or otherwise properly respond to the movements of the active emergency vehicle in accordance with traffic laws and other best practices for driving.

The features described above may provide for an autonomous vehicle that is able to identify emergency vehicles, which may vary largely in appearance, at an earlier point in time, at a farther distance, and using less data than other machine learning techniques. As such, the autonomous vehicle may then begin to prepare to respond to the emergency vehicle at an earlier point in time. In addition, the features described also provide for a method of identifying false positives that allows the autonomous vehicle to respond accurately to objects in its environment.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A system for detecting an emergency Vehicle, the system comprising:
   one or more computing devices in communication with an operational system of a vehicle, the One or more computing devices being configured to:
      receive an image of an environment from a perspective of the vehicle;
      generate a plurality of gates in the image, wherein each of the plurality of gates represents a region of interest at a respective distance from the vehicle;
      detect lights within at least one of the plurality of gates;
      identify an emergency vehicle in the received image based on the detected lights and the at least one of the plurality of gates; and
      operate the operational system of the vehicle based on the identified emergency vehicle.

2. The system of claim 1, wherein the one or more computing devices are configured to identify the emergency vehicle in the received image further based on one or more masked pixels of the received image.

3. The system of claim 2, wherein the one or more computing devices are further configured to identify one or more pixels in the received image to mask based on 3D geometry information of the environment.

4. The system of claim 3, wherein the 3D geometry information is associated with a detected object in the environment; and wherein the one or more computing devices are further configured to: project the 3D geometry information into the received image; and identify pixels in the received image covered by the projection; and mask the covered pixels.

5. The system of claim 1, wherein the one or more computing devices are further configured to, before identifying the emergency vehicle, filter out one or more objects in the image.

6. The system of claim 5, wherein the one or more computing devices are configured to filter out the one or more objects based on features of the one or more objects that are uncharacteristic of an active emergency vehicle.

7. The system of claim 5, wherein the one or more computing devices are configured to filter out the one or more objects based on a heading of the one or more objects.

8. The system of claim 1, wherein the one or more computing devices are further configured to select one or more regions in the image for generating the plurality of gates.

9. The system of claim 1, wherein the one or more computing devices are further configured to validate that the identified emergency vehicle is active.

10. The system of claim 9, wherein the one or more computing devices are configured to validate that the emergency vehicle is active based on additional images of the environment.

11. The system of claim 9, wherein the one or more computing devices are configured to validate that the emergency vehicle is active based on characteristics of the identified emergency vehicle and characteristics of other detected objects in the environment.

12. The system of claim 11, wherein the one or more computing devices are further configured to identify characteristics of the emergency vehicle based on the plurality of gates of the image.

13. The system of claim 1, wherein each one of the plurality of gates has a height based on an expected maximum height of an emergency vehicle in an area.

14. The system of claim 1, wherein each one of the plurality of gates spans a width corresponding to one or more lanes which are encompassed within the region of interest.

15. The system of claim 1, wherein each one of the plurality of gates is spaced a predetermined distance from a subsequent gate of the plurality of gates.

16. The system of claim 1, further comprising the vehicle.

17. A method for detecting an emergency vehicle, the method comprising:
   receiving, by one or more computing devices, an image of an environment taken from a perspective of an autonomous vehicle;
   generating, by the one or more computing devices, a plurality of gates in the image, wherein each of the plurality of gates represents a region of interest at a respective distance from the vehicle;
   detecting, by the one or more computing devices, lights within at least one of the plurality of gates;
   identifying, by the one or more computing devices, an emergency vehicle in the received image based on the detected lights in the at least one of the plurality of gates; and
   operating, by the one or more computing devices, an operational system of the vehicle based on the identified emergency vehicle.

18. The method of claim 17, wherein the identifying the emergency vehicle in the received image includes identifying one or more masked pixels of the received image.

19. The method of claim 18, wherein the identifying the one or more masked pixels of the received image is based on 3D geometry information of the environment.

20. The method of claim 19, wherein the 3D geometry information is associated with a detected object in the environment; and
the identifying the one or more masked pixels includes:
projecting the 3D geometry information into the received image; and
identifying pixels in the received image covered by the projection; and
masking the covered pixels.

* * * * *

UNITED STATES PATENT AND TRADEMARK OFFICE
CERTIFICATE OF CORRECTION

PATENT NO. : 11,727,692 B2
APPLICATION NO. : 17/555760
DATED : August 15, 2023
INVENTOR(S) : Mayank Bansal It is certified that error appears in the above-identified patent and that said Letters Patent is hereby corrected as shown below:

In the Claims

Claim 1, Column 19, Line 40:
Now reads: "Vehicle" should read -- vehicle --

Claim 1, Column 19, Line 43:
Now reads: "One" should read -- one --

Signed and Sealed this
Tenth Day of October, 2023

Katherine Kelly Vidal
*Director of the United States Patent and Trademark Office*